United States Patent
Regan et al.

(10) Patent No.: US 11,358,098 B2
(45) Date of Patent: Jun. 14, 2022

(54) CARBON NEGATIVE SHIP BALLASTING SYSTEM

(71) Applicant: X Development LLC, Mountain View, CA (US)

(72) Inventors: William Raymond Regan, San Carlos, CA (US); Thomas Peter Hunt, Oakland, CA (US); Thomas Gerard Schuhmann, Jr., Mountain View, CA (US); Benjamin Lundquist Saenz, Berkeley, CA (US); Joel Fraser Atwater, Danville, CA (US); James Daniel Haley, Oakland, CA (US); Kevin Forsythe Smith, Pleasanton, CA (US); Charles Nordstrom, Berkeley, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 17/085,552

(22) Filed: Oct. 30, 2020

(65) Prior Publication Data

US 2021/0129078 A1 May 6, 2021

Related U.S. Application Data

(60) Provisional application No. 62/928,656, filed on Oct. 31, 2019.

(51) Int. Cl.
| | | |
|---|---|---|
| *B01D 53/34* | (2006.01) | |
| *B01D 53/62* | (2006.01) | |
| *B01D 53/80* | (2006.01) | |
| *B63B 25/00* | (2006.01) | |
| *B63B 39/03* | (2006.01) | |
| *B63H 21/00* | (2006.01) | |

(52) U.S. Cl.
CPC .......... *B01D 53/62* (2013.01); *B01D 53/346* (2013.01); *B01D 53/80* (2013.01); *B63B 25/002* (2013.01); *B63B 39/03* (2013.01); *B63H 21/00* (2013.01); *B01D 2251/404* (2013.01); *B01D 2251/604* (2013.01); *B01D 2257/504* (2013.01); *B63B 2211/00* (2013.01)

(58) Field of Classification Search
CPC .......... B01D 2215/00; B01D 2251/404; B01D 2257/504; B01D 2258/06; B01J 10/00; B01J 19/00; B01J 2219/00; B63B 39/03; B63B 13/00; B63B 2211/00; B63B 2207/00; B63H 21/00; Y02C 20/40; Y02T 70/00

See application file for complete search history.

(56) References Cited

U.S. PATENT DOCUMENTS

| | | |
|---|---|---|
| 3,234,580 A | 2/1966 | Keck |
| 8,974,756 B2 | 3/2015 | Martin |
| 2007/0238044 A1 | 10/2007 | Nakamura |
| 2009/0107111 A1 | 4/2009 | Oliver |
| 2014/0373677 A1 | 12/2014 | Stumpf et al. |
| 2020/0061527 A1* | 2/2020 | Gong ................ B63J 4/002 |
| 2021/0129967 A1* | 5/2021 | Regan ................ B63B 13/00 |

OTHER PUBLICATIONS

Gagern et al., "Ocean Alkalinity Enhancement: Current state of knowledge and potential role of philanthropy," Sep. 9, 2019 Meeting Proceedings, 50 pages.

* cited by examiner

*Primary Examiner* — Timothy C Vanoy
(74) *Attorney, Agent, or Firm* — Fish & Richardson P.C.

(57) ABSTRACT

A method for ship ballasting includes receiving, at a carbon negative energy storage system, input comprising calcium oxide and water and reacting, within a reaction chamber of the carbon negative energy storage system, the calcium oxide and water to release energy and generate calcium hydroxide. The method includes directing, by the carbon negative energy storage system, the released energy to a requesting end user and providing, by the carbon negative energy storage system, the calcium hydroxide to a marine vessel ballasting system. The method includes releasing a mixture of the calcium hydroxide and ballast water from the marine vessel ballasting system into the ocean to sequester atmospheric $CO_2$.

20 Claims, 13 Drawing Sheets

FIG. 7

CONTROL SYSTEM 620

MODELS 712

MATERIAL DISPENSING SYSTEM 630

SENSING SYSTEM 608

TRAINING MODULE 710

EXAMPLES 702

GROUND TRUTH

700

1100

1102 — MODELLING, BASED ON ONE OR MORE PARAMETERS SELECTED FROM THE GROUP CONSISTING OF: A GEOGRAPHICAL PARAMETER DEFINING AN AREA IN OCEAN WATER, AN OCEAN CHEMISTRY PARAMETER, AND A MATERIAL PARAMETER, A PARTICULAR ASPECT OF OCEAN CHEMISTRY

1104 — DETERMINING, BASED ON THE ONE OR MORE PARAMETERS, THE MODELLED PARTICULAR ASPECT OF OCEAN CHEMISTRY, AND A TARGET CHEMICAL CONCENTRATION, A FIRST AMOUNT OF MATERIAL AND A FIRST RATE AT WHICH THE MATERIAL IS TO BE RELEASED FROM A SHIP INTO OCEAN WATER

1106 — GENERATING A CONTROL INSTRUCTION FOR A MATERIAL DISPENSING SYSTEM TO RELEASE THE FIRST AMOUNT OF THE MATERIAL AT THE FIRST RATE INTO OCEAN WATER

FIG. 11

CARBON NEGATIVE SHIP BALLASTING SYSTEM

CROSS-REFERENCE TO RELATED APPLICATION

This application claims the benefit of U.S. Provisional Application No. 62/928,656, filed Oct. 31, 2020, the contents of which are incorporated by reference.

FIELD

This specification relates to carbon negative energy storage as applied to marine transportation.

BACKGROUND

Carbon dioxide, or $CO_2$, is a common, naturally occurring molecule that is present in the earth's atmosphere and plays an important role in the earth's carbon cycle. All humans and animals exhale carbon dioxide when they breathe, and activities such as deforestation and burning bunker fuels (typically any type of fuel oil used aboard marine vessels, including crude oil, natural gas, diesel, and other hydrocarbons—including alcohols such as methanol) further increase atmospheric $CO_2$. While $CO_2$ is a natural part of Earth's atmosphere and keeps the world at a livable temperature by trapping energy from the sun, elevated levels of $CO_2$ can result in too much heat or energy being trapped in the atmosphere, as well as climatic instability. Additionally, elevated levels of $CO_2$ above a certain threshold can have negative physiological impacts on humans and other life.

SUMMARY

Elevated $CO_2$ levels have significant impacts on the ecosphere such as a rise in temperature or ocean acidity. The marine transportation and cement industries are large producers of carbon pollution. The cement industry also produces calcium oxide at large scales. Calcium oxide mixed with water produces calcium hydroxide and energy. This energy can be used to power a propulsion or energy generation system. Mixing the calcium hydroxide byproduct into the ocean pulls atmospheric $CO_2$ into the ocean by increasing ocean alkalinity and neutralizing carbonic acid.

Ocean-based carbon dioxide removal is an important option for drawing down atmospheric $CO_2$. However, methods for adding chemicals to the ocean to remove carbon dioxide to the atmosphere can cause changes in ocean chemistry that negatively affect ecosystems. In addition, chemical effects of ocean chemistry modification, such as limestone precipitation, can reduce the amount of carbon dioxide removed by any chemical additives dispersed into the ocean. With controlled distribution, the addition of chemicals to the ocean may positively affect ecosystems, for example, by combatting ocean acidification.

The proposed method can be implemented as a ballasting system within a marine vessel.

Systems for implementing the proposed method can be embodied in various form factors.

In one general aspect, a carbon negative method for ballasting a marine vessel includes receiving, at a carbon negative energy storage system, input including calcium oxide and water and reacting, within a reaction chamber of the carbon negative energy storage system, the calcium oxide and water to release heat and generate calcium hydroxide. The method includes directing, by the carbon negative energy storage system, the released heat to a requesting end user and providing, by the carbon negative energy storage system, the calcium hydroxide to a marine vessel ballasting system. The method includes releasing a mixture of the calcium hydroxide and ballast water from the marine vessel ballasting system into the ocean to sequester atmospheric $CO_2$.

In some implementations, the input includes calcium metal.

In another general aspect, a carbon negative ship ballasting system includes an energy recovery system configured to react input including calcium oxide and water to release heat and generate calcium hydroxide and direct the released heat to a requesting end user and a marine vessel. The marine vessel includes one or more ballast tanks that receive the calcium hydroxide from the energy recovery system and a pumping system that pumps ballast fluid containing the calcium hydroxide into and out of the one or more ballast tanks, wherein pumping ballast fluid containing the calcium hydroxide out of the ballast tank sequesters atmospheric $CO_2$.

In some implementations, the input includes calcium metal.

In another general aspect, a carbon negative ship ballasting method includes receiving, at a carbon negative energy storage system, input including magnesium oxide and water and reacting, within a reaction chamber of the carbon negative energy storage system, the magnesium oxide and water to release heat and generate magnesium hydroxide. The method includes directing, by the carbon negative energy storage system, the released heat to a requesting end user and providing, by the carbon negative energy storage system, the magnesium hydroxide to a marine vessel ballasting system and releasing a mixture of the magnesium hydroxide and ballast water from the marine vessel ballasting system into the ocean to sequester atmospheric $CO_2$.

In some implementations, the input includes magnesium metal.

In another general aspect, a carbon negative ship ballasting system includes an energy recovery system configured to react input comprising magnesium oxide and water to release heat and generate magnesium hydroxide and direct the released heat to a requesting end user and a marine vessel. The marine vessel includes one or more ballast tanks configured to receive the magnesium hydroxide from the energy recovery system and a pumping system configured to pump ballast fluid containing the magnesium hydroxide into and out of the one or more ballast tanks, wherein pumping ballast fluid containing the magnesium hydroxide out of the ballast tank into the ocean sequesters atmospheric $CO_2$.

In some implementations, the input includes magnesium metal.

The proposed method can be implemented as an energy generation system onboard a marine vessel. Furthermore, the system can be applied to monitor and modulate ocean chemistry by releasing environmentally beneficial additives into the ocean in a controlled manner. The system can restrict the release of the additives based on a particular geographic region, localized ocean chemistry, and overall ocean chemistry, among other parameters.

Additionally, calcium-containing materials such as calcium oxide and/or calcium hydroxide can be carried aboard ships such as cargo ships. Some cargo ships are "deadheading" ships that are full of cargo in one direction and empty in the opposite direction. This leads to an inefficient use of space. One option to improve the use of space includes carrying calcium-containing material in the empty containers. However, such materials can be corrosive and can erode the containers in which the calcium-containing material is held. By adding a protective bladder made of specialized material that is corrosion-resistant, the empty containers can be loaded with calcium-containing material and the cargo ship can carry and dispense the calcium-containing material along its path of travel.

Throughout the description below, calcium can be used in addition to, or in place of, calcium oxide. Additionally, magnesium and magnesium oxide can be used in place of calcium and calcium oxide. In some implementations, calcium hydroxide, magnesium oxide, magnesium hydroxide, sodium oxide, sodium hydroxide, and other suitable alkali compounds can be used in place of calcium oxide.

This relatively unlimited, cheap method for $CO_2$ capture includes utilizing calcium oxide to power a propulsion system and dispensing the products of the propulsion reaction into the ocean to sequester atmospheric $CO_2$. In some implementations, the products of the reaction can even combat the acidification of the ocean when dispensed into particular ecosystems.

Furthermore, this method can be implemented within an ocean chemistry modification control system that includes a sensing system that detects one or more parameters selected from the group consisting of: a geographical parameter defining an area in ocean water, an ocean chemistry parameter, and a material parameter. The system includes a material dispensing system for installation on a ship that releases material from the ship into ocean water. In some implementations, the system includes a material dispensing system comprising one or more independently controlled modules that each release material into ocean water. The system also includes a controller that controls the material dispensing system according to a target chemical concentration. The controller controls the material dispensing system by modelling, based on the one or more parameters, a particular aspect of ocean chemistry, determining, based on the one or more parameters, the modelled particular aspect of ocean chemistry, and the target chemical concentration, a first amount of material and a first rate at which the material is to be released from the ship into ocean water, and generating a control instruction for the material dispensing system to release the first amount of the material at the first rate into ocean water.

In some implementations, generating a control instruction for the material dispensing system can include generating, for each of the one or more independently controlled modules, a control instruction.

The proposed invention also provides a novel system for monitoring and modulating ocean chemistry by releasing alkali compounds into the ocean in a controlled manner. The system provides local and relatively immediate protection for a vulnerable population or ecosystem. The system can restrict the release of the compounds based on a particular geographic region, localized ocean chemistry, and overall ocean chemistry, among other parameters.

Machine learning models or finite element models can be applied to the proposed methods to model and predict ocean flow, mixing, chemical dispersion, and plume patterns, among other processes and determine mixing and output instructions to optimize for parameters such as ocean chemistry, environmental factors, ship status, etc. For example, the proposed system can automatically determine an optimal concentration of seawater to chemicals needed to produce desired ocean chemistry in the wake of the ship. The proposed system can automatically determine an optimal direction and time at which to release an optimal amount of slaked lime into the ocean to maintain a particular concentration of lime in the particular area of the ocean.

The system can be implemented as a controller integrated with ship subsystems and networks, including existing monitoring and sensing systems, ballasting systems, storage tanks, and power systems, among other systems. The controller can perform data modeling and generate control instructions locally. In some implementations, the controller can be implemented as a distributed computing system.

The proposed bladder solution for storing calcium-containing material allows ships to quickly be loaded with calcium-containing material, bypassing the need to swap containers already onboard a ship for containers that are treated to handle the calcium-containing material. The bladder system also allows ships to store dry calcium-containing material onboard, increasing the capacity of the ship to hold the material to be released as compared to the ship's capacity to hold diluted mixtures of the calcium-containing material. The bladder solution allows a ship to carry calcium-containing materials with minimal retrofitting. Furthermore, the order in which the cargo containers are filled with calcium-containing material and/or mixed with seawater can be used to control ship ballasting and maintain ship stability. In some implementations, the active container system can circumvent the ship's existing ballasting system, including the tanks, pumps, and pipes, removing the risk of accelerated corrosion damage to the ship.

This active, modular container system includes multiple interconnected containers that form a smart container system. This system can generate power to run auxiliary systems, provide the proper mixture of chemicals to seawater to produce a particular chemical concentration, and draw seawater in from the outside, among other functions. This system can be integrated with existing systems, and includes a controller that controls components associated with each of the containers in the system.

Machine learning models can be applied to the proposed methods to select and modify concentrations needed from the system. For example, the proposed system can automatically determine an optimal amount of water to pull from the ocean to mix into the container system and produce a particular chemical concentration.

The system can be implemented as a system that is integrated in a ship with one or more existing systems. The system can be modular and includes flexible bladders that can be retrofitted to existing shipping containers as well as a mixing system for calcium-containing material that is loaded into the bladders of the containers.

In one aspect of the invention, an active, modular containerized system for a ship includes two or more shipping standard compliant containers connected by piping, where a first container is for connection to the outside of the ship and a second container contains calcium oxide, each of the two or more containers having a protective bladder lining manufactured according to a target protection parameter based on the calcium oxide. The system includes a mixing system that is connected to each of the two or more containers by piping. The system includes a controller that controls the mixing system by providing control signals to the mixing system to control the mixing of calcium oxide and ocean water by controlling the connection of the first container when connected to the outside of the ship and by controlling the connection between the second container and the first container.

The details of one or more implementations are set forth in the accompanying drawings and the description, below.

BRIEF DESCRIPTION OF THE DRAWINGS

FIG. 7 is an example data flow for a control system for ocean chemistry modification.

FIG. 11 is a flow chart of an example process of ocean chemistry modification.

Like reference numbers and designations in the various drawings indicate like elements. The components shown here, their connections and relationships, and their functions, are meant to be examples only, and are not meant to limit the implementations described and/or claimed in this document.

DETAILED DESCRIPTION

Figure 1:
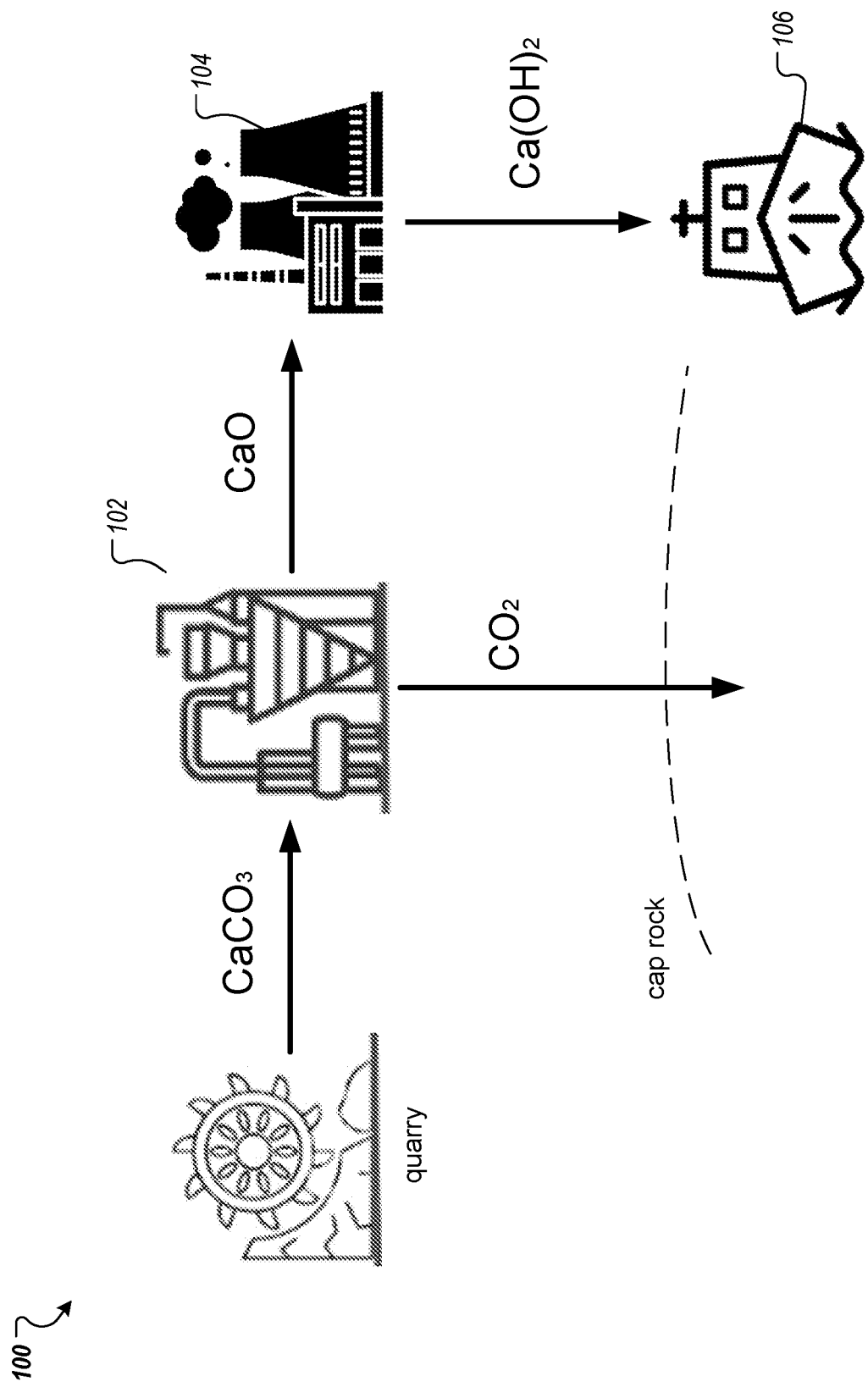
FIGS. 1-3 are diagrams of an example configuration of a carbon negative energy storage system.

Reducing elevated levels of $CO_2$ has become an increasingly important area of study. In addition to having significant impacts on the ecosphere, levels of $CO_2$ beyond a certain threshold have negative physiological impacts on humans. A carbon negative method of ballasting marine vessels that utilizes source materials and byproducts of the cement and marine shipping industry is described herein.

Marine shipping is a significant emitter of greenhouse gases due to the prevalence of bunker fuel (which produces massive amounts of $CO_2$ when burned) in powering ship engines. The cement industry is also a big emitter with direct (chemical reactions to produce source materials) and indirect (fossil fuel used for heating systems) emissions. Together, these industries account for almost 10% of the world's greenhouse gas emissions.

The primary ingredient of cement is calcium oxide (CaO). Calcium oxide is produced from calcining calcium carbonate ($CaCO_3$). For example, calcium carbonate can be placed in a kiln and calcined to produce calcium oxide. This process also generates flue gas with high concentrations of $CO_2$, which can be separated and sequestered or placed in long-term storage by injecting it into the ground below, for example, cap rock.

Energy recovery can take place at the site of the kiln by using the heat to preheat or help drive the calcium carbonate decomposition. This energy storage mechanism—storing calcium oxide and reacting it with water when energy is needed may allow industrial plants such as cement plants to run on more intermittent, renewable resources such as solar power or wind power.

Energy storage can also be done off site at industrial plants, such as retrofitted coal power plants (with adapted boilers) or at custom power plants by storing calcium oxide and reacting it with water when energy is needed. This on-demand energy generation method uses source materials already generated by the cement industry and produces useful byproducts such as calcium hydroxide.

The product of the reaction between calcium oxide and water—calcium hydroxide ($Ca(OH)_2$)—can be mixed into ballast water to provide systems that provide stability to a marine vessel. When a vessel's cargo load is reduced, it needs to take on water as ballast to provide stability. For example, a ship will take on water in its bilge to give it the necessary floating stability. When ships take on water as ballast, potential issues such as the transportation of parasitic species arise. These issues require additional costly procedures such as pumping, purging, and disinfecting the bilge of a ship.

Calcium hydroxide can be mixed into ballast water to create a highly basic environment that is inhospitable to invasive species and is safe to be dispensed into the ocean when ballast water is discharged. Once disposed of within the ocean, calcium hydroxide pulls down and sequesters atmospheric $CO_2$, producing a negative carbon impact. By equipping marine vessels with a ballasting solution that also facilitates $CO_2$ removal, the proposed method reduces a marine vessel's carbon footprint and eliminates certain procedures necessary for maintaining the vessel.

The proposed method can be implemented as a system that reacts calcium oxide with water when energy is needed, uses the heat released for energy generation, and provides the products of the reaction to be used as carbon negative ballasting.

Using cement materials to store energy and ballast marine vessels co-benefits these large industries and provides an avenue for cleaner shipping and cement industries.

A significant portion of current $CO_2$ emissions in the atmosphere are absorbed by the oceans. Ocean water contains negatively charged bicarbonate ions, which are balanced with positive ions such as calcium and magnesium. A build-up of such positive ions through increasing ocean alkalinity can effect an uptake of $CO_2$ in ocean water, known as carbon sequestration, that can mitigate the elevated levels of $CO_2$ in the atmosphere. Ocean alkalinity enhancement (OAE) is a promising pathway for carbon dioxide removal because it mimics naturally occurring phenomena that reduce both ocean acidification and atmospheric $CO_2$ levels.

The proposed system also allows for ocean chemistry modification, for example, through increased alkalinity by adding crushed magnesium or calcium bearing rocks or calcium or magnesium hydroxide into the ocean. When $CO_2$-reactive forms of alkalinity are added, they react rapidly with seawater $CO_2$ to form non-$CO_2$-reactive bicarbonates, consuming acidity and elevating pH, in addition to increasing $CO_2$ adsorption of the ocean.

Furthermore, the proposed system allows for more efficient use of space aboard cargo ships and other marine vessels that currently travel with unused cargo holds. This active, modular container system also allows an existing ship to be fitted to carry calcium-containing materials used for ocean chemistry modification, for example, through increased alkalinity by adding crushed magnesium or calcium bearing rocks or calcium or magnesium hydroxide into the ocean. When $CO_2$-reactive forms of alkalinity are added, they react rapidly with seawater $CO_2$ to form non-$CO_2$-reactive bicarbonates, consuming acidity and elevating pH, in addition to increasing $CO_2$ adsorption of the ocean. The system increases a ship's capacity for carrying such calcium-containing materials by allowing ships to store calcium-containing materials in a dry form as opposed to a pre-mixed and diluted slurry.

Because the system is modular, allowing for components to be added to existing ships and integrated with existing systems while providing the same or a similar level of functionality. The system can control a container system onboard a ship having a single container just as it can control a container system onboard a ship having multiple containers. The system can be integrated with different power systems, piping systems, ballast systems, and other systems of a ship.

FIG. 1 is a diagram of an example configuration of a carbon negative energy storage system 100. System 100 provides on-demand energy by reacting calcium oxide with water when energy is needed. The reaction product, calcium hydroxide, can then be used as ballasting for marine vessels, and eventually can be dispensed into the ocean to sequester $CO_2$, reducing atmospheric concentrations of carbon.

System 100 is shown to include a kiln 102, an industrial plant 104, and a marine vessel 106.

Kiln 102 is an industrial calcination system that receives and calcinates calcium carbonate ($CaCO_3$), otherwise known as limestone.

Industrial plant 104 is a power plant such as a retrofitted coal plant or a plant specifically designed for extracting energy from calcium oxide.

Marine vessel 106 is a marine vessel, such as a ship, that uses a ballast to stabilize itself within the ocean. Marine vessel 106 includes various dilution and ballast tanks that are sterilized by the high pH of the seawater and calcium hydroxide slurry used within the ballasting system. In some implementations, the tanks can be serpentine or inflated plastic tanks retrofit inside of the existing ballast volume.

Calcium carbonate is mined and provided to kiln 102 in its unprocessed form. Kiln 102 then calcinates the calcium carbonate to produce calcium oxide and flue gas having high concentrations of $CO_2$. As described above, the $CO_2$ can be separated from the flue gas through a separation system and put into long-term storage or sequestered by, for example, pumping it under cap rock. In some implementations, a kiln 102 that is specially designed to exhaust pure $CO_2$ can be used.

Calcium oxide can then be reacted with water to produce energy and calcium hydroxide. The energy released when calcium oxide and water reacts is thus "stored" within the calcium oxide. Therefore, the process of generating cement ingredient calcium oxide can also act as an energy storage solution. Processes for storing and releasing energy from calcium oxide are described below with respect to FIGS. 2-3.

The calcium hydroxide product of the calcium oxide and water reaction can then be used in ballasting for marine vessels, such as marine vessel 106, to sequester atmospheric $CO_2$ in the ocean and to reduce the maintenance required of ship ballasts. Processes for implementing a calcium hydroxide ballast are described below with respect to FIG. 4. In some implementations, other inputs such as Ca (calcium), Mg (magnesium), or MgO (magnesium oxide) can be used in addition to or in place of calcium oxide. For simplicity, this specification describes all embodiments and examples with respect to calcium oxide, but calcium metal, magnesium, and magnesium oxide can be used in all instances in which calcium oxide is used. It is further understood that embodiments using calcium and magnesium may require different forms of production, such as electrolytic reduction.

Figure 2:
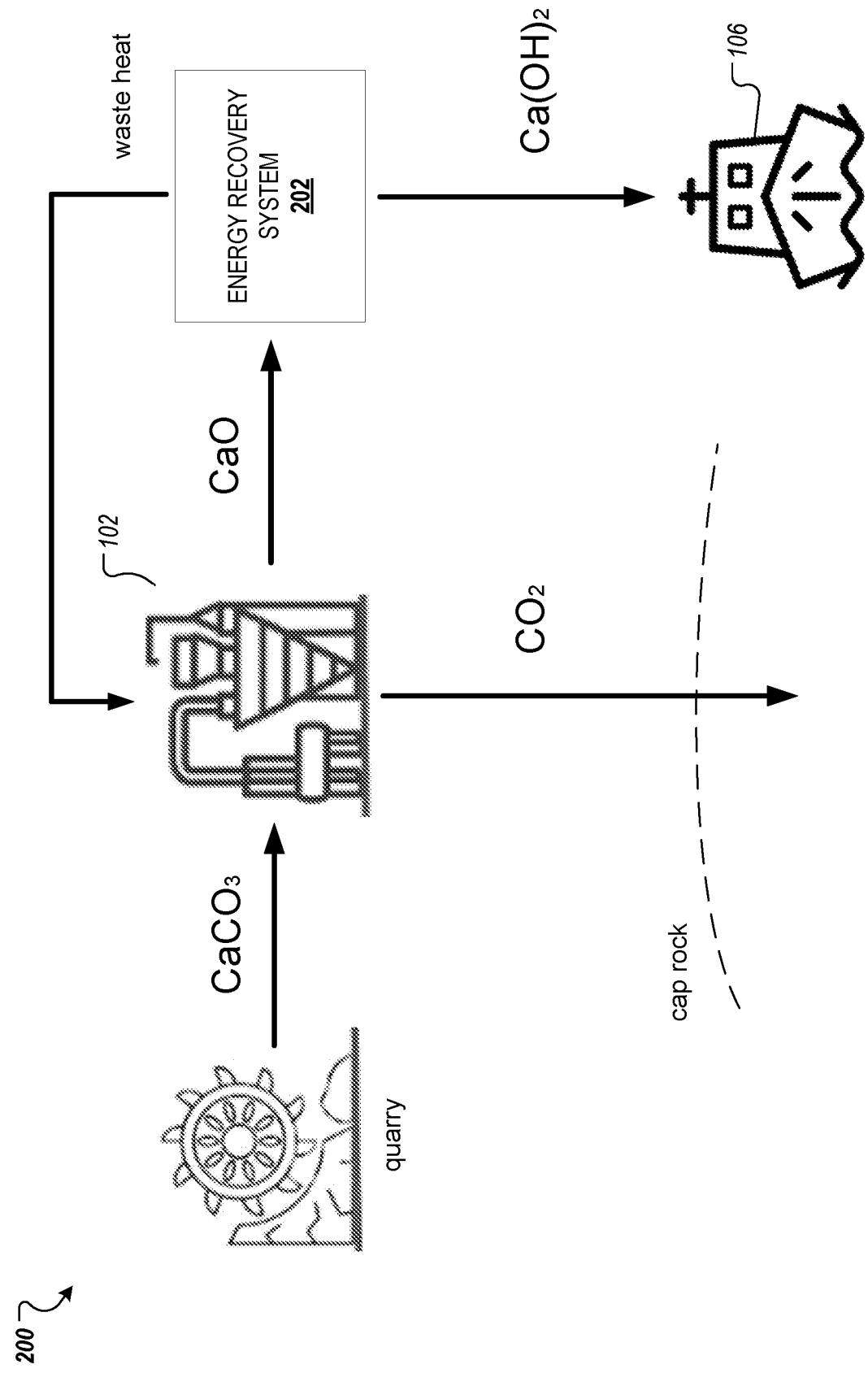

FIG. 2 is a diagram of an example application 200 of the carbon negative energy storage system that includes energy recovery at the site of the kiln.

System 200 includes system 100 as described above with respect to FIG. 1. In addition, system 200 includes an energy recovery system 202 at the site of kiln 102. Energy recovery system 202 receives input of calcium oxide and, upon demand, reacts the calcium oxide with water to produce energy and calcium hydroxide. The energy can be directed to kiln 102 to preheat the kiln, and thus some of the energy used to create the calcium hydroxide can be recovered and fed back into the system. In some implementations, the energy can be used to power other operations at the site of kiln 102.

This on-demand energy recovery system may allow for system 200 to rely on more intermittent resources of renewable energy, such as wind or solar power.

Figure 3:
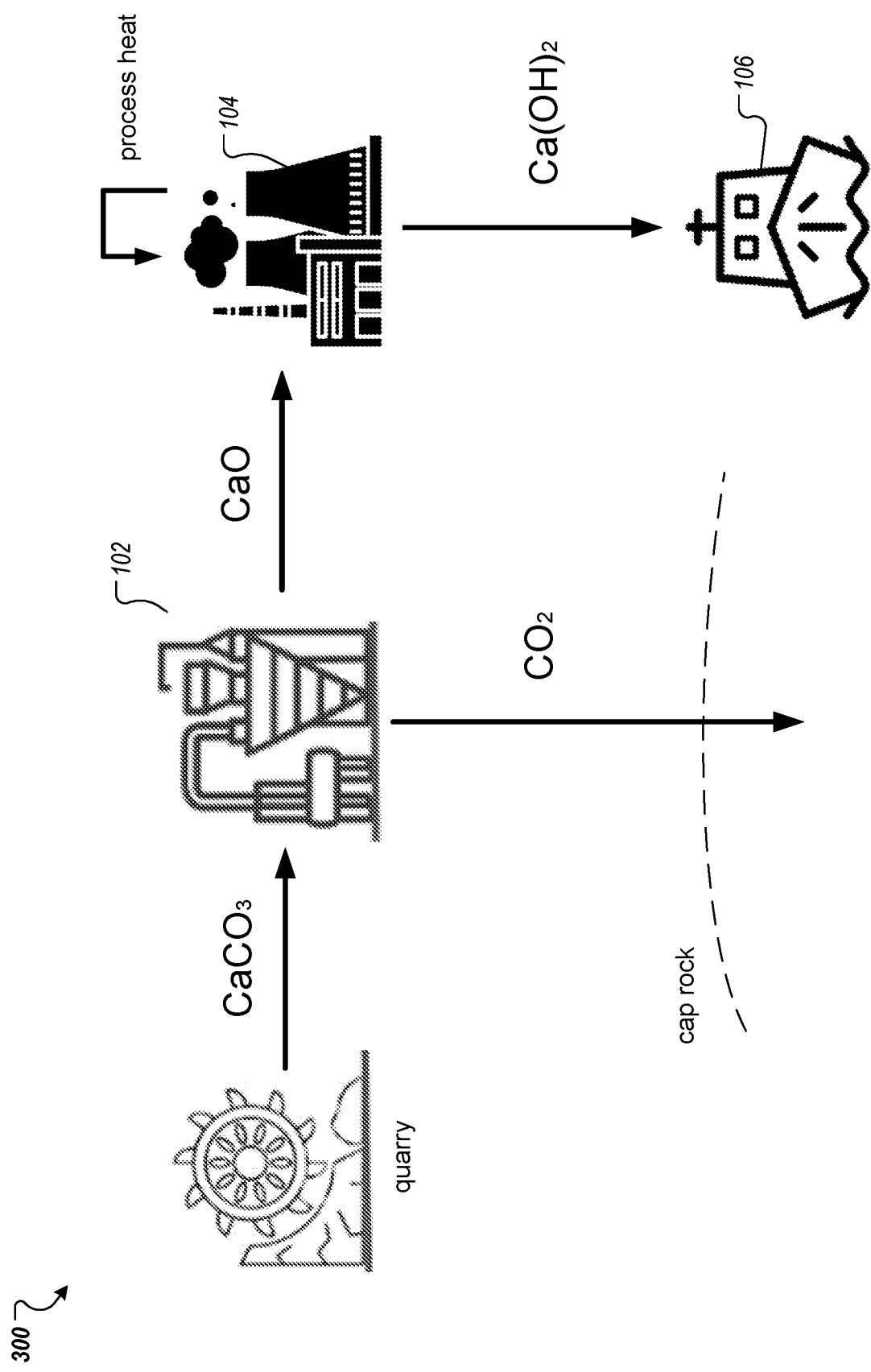

FIG. 3 is a diagram of an example application 300 of the carbon negative energy storage system that includes energy recovery off site at an industrial plant such as industrial plant 104.

System 300 includes system 100 as described above with respect to FIG. 1. As described above, industrial plant 104 is a power plant such as a retrofitted or modified coal plant or a plant specifically designed for extracting energy from calcium oxide. Industrial plant 104 receives input of calcium oxide and, upon demand, reacts the calcium oxide with water to produce energy and calcium hydroxide. The energy can be directed to various end uses, such as distribution to auxiliary systems of industrial plant 104 or consumers, and therefore some of the energy used to create the calcium oxide can be recovered and used for other purposes.

In some implementations, industrial plant 104 is a coal plant having boilers that are retrofitted to adapt to receiving heat energy from the calcium oxide and water reaction. In other implementations, industrial plant 104 is a power plant specifically designed to extract power from the calcium oxide and water reaction. For example, industrial plant 104 can include steam engines or turbines driven by the heat energy from the calcium oxide and water reaction. The steam engines or turbines then drive generators.

The calcium hydroxide product may be stored in aqueous form and transported to ports where it is added to ship ballasting, such as a ballast for marine vessel 106. For example, the calcium hydroxide product can be stored in large tanks and transported by pipeline, tanker truck, rail, etc. to the ports.

Figure 4:
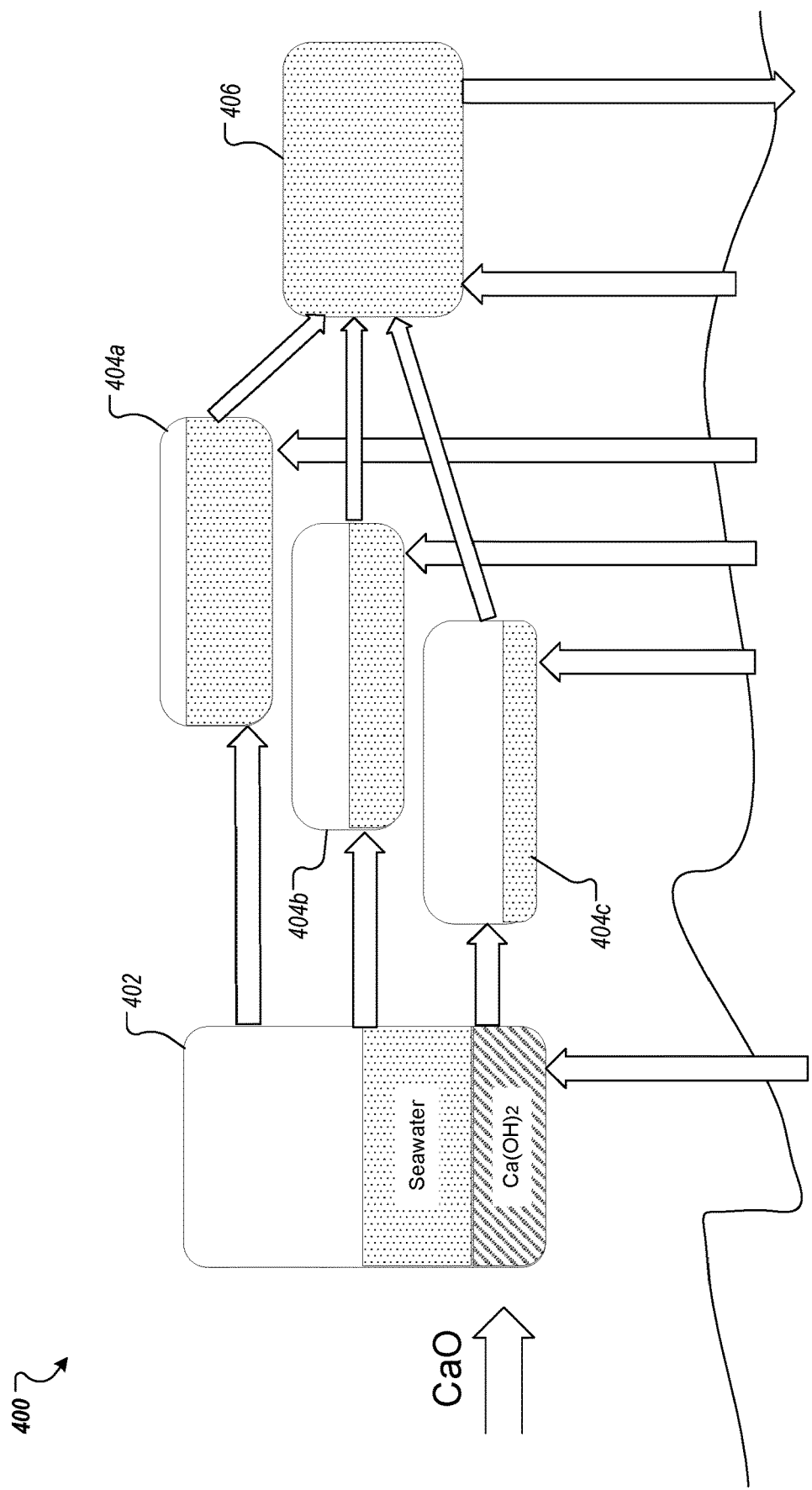
FIG. 4 is a diagram of an example configuration of a carbon negative ballasting system.

FIG. 4 is a diagram of an example configuration of a carbon negative ballasting system.

When cargo is low, a ship needs to take on ballast water. For example, when discharging cargo at a port, a ship needs to pump in more ballast water. When a ship's cargo hold is empty during its voyage, its ballast tank must be full to stabilize itself. When the cargo hold is full, the ship needs to discharge ballast water. For example, when loading cargo at a port, a ship needs to discharge ballast water. Ballast tanks can also be used for load balancing; in some implementations, when the ship's cargo hold is full during its voyage, its ballast tank is empty, and in some implementations, even when the ship's cargo hold is full, its ballast tank need not be empty.

System 400 includes a main calcium hydroxide slurry ballast tank 402, variable ballast tanks 404a, 404b, and 404c, dilution system 406, and pumping system 408.

Main calcium hydroxide slurry ballast tank 402 holds a mixture of calcium hydroxide and seawater. The calcium hydroxide can be loaded into tank 402 in port, for example, as a product from the calcium oxide and water reaction of systems 100, 200, or 300 as described above with respect to FIGS. 1-3. The calcium hydroxide can also be loaded as exhaust from a calcium oxide engine onboard the marine vessel. For example, if the marine vessel uses a calcium oxide engine that exhausts calcium hydroxide, this reaction product can be loaded as ballasting for the marine vessel.

Pumping system 408 pumps seawater and the calcium hydroxide and seawater slurry into and out of ballasting system 400 as needed. Pumping system 408 is connected to main calcium hydroxide slurry ballast tank 402, variable ballast tanks 404a, 404b, and 404c, and dilution system 406.

The seawater can be pumped into tank 402 as needed. The pH of the calcium hydroxide and seawater mixture is fixed at around 12.5 at typical ocean temperature due to the low solubility of calcium hydroxide. The amount of total solids within tank 402 can be dependent on the voyage: when a vessel has a smaller cargo load, more ballasting is required, and thus the concentration level of calcium hydroxide is lower due to the larger amount of seawater needed.

The calcium hydroxide can be in the form of dry calcium hydroxide or a slurry mixture of calcium hydroxide and seawater. This dry powder or slurry mixture can be loaded onto the marine vessel in port or at sea by, for example, a tender ship.

Variable ballast tanks 404a, 404b, and 404c are used for cargo handling and throughout the voyage. Tanks 404a, 404b, and 404c are diluted to around pH 11.

Each of tank 402 and tanks 404a, 404b, and 404c is sterilized by the high pH concentration. However, this high pH concentration must be diluted before being dispensed into the ocean. Dilution system 406 dilutes the ballast slurry within tank 402, 404a, 404b, and 404c to a harmless pH (around pH 9) before being pumped out when the marine vessel discharges ballast water.

Figure 5:
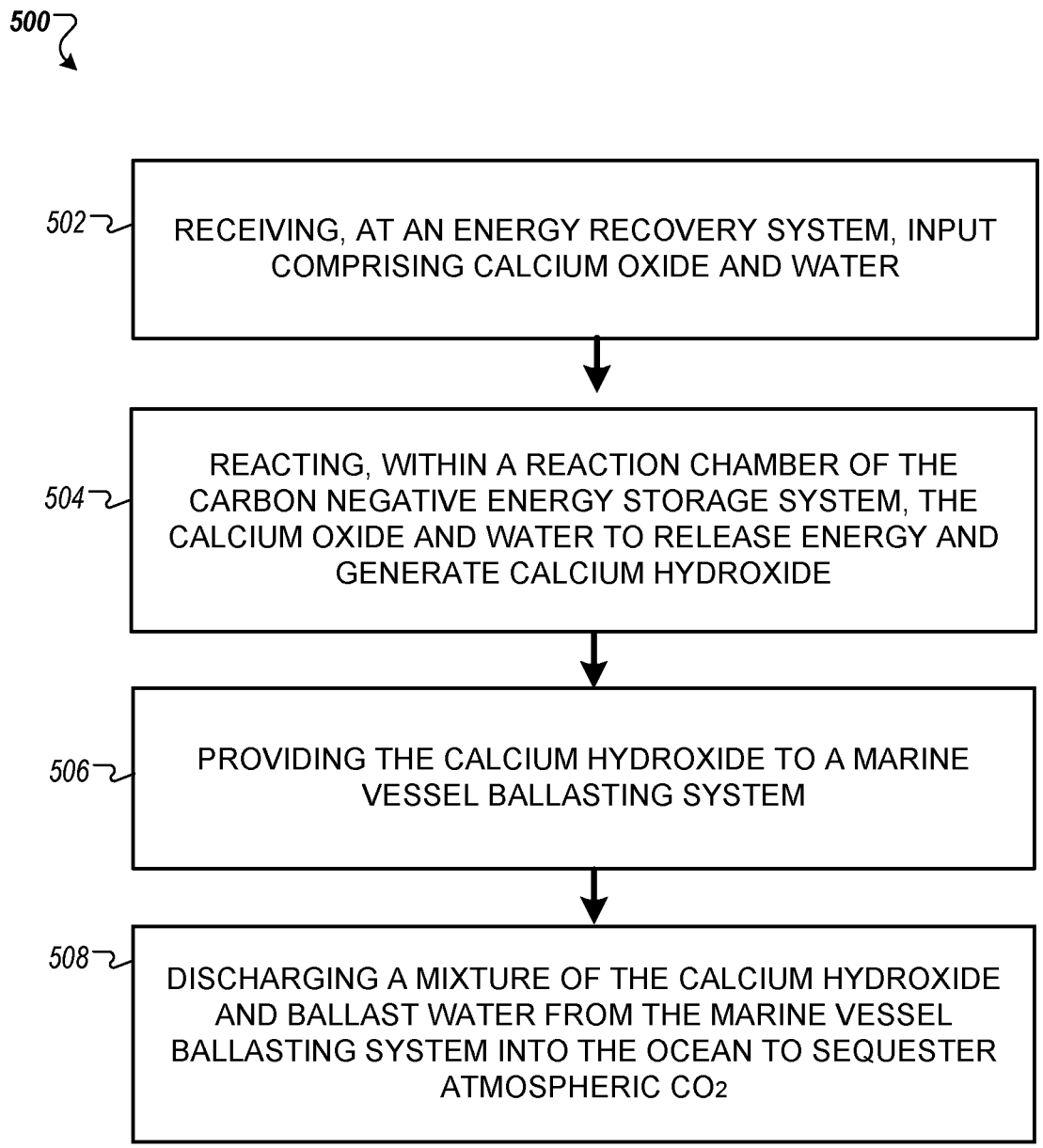
FIG. 5 is a flow chart of an example process of carbon negative energy storage.

FIG. 5 is a flowchart of an example process 500 of carbon negative energy storage. Process 500 can be implemented by carbon negative energy storage systems such as systems 100, 200, 300, and 400 as described above with respect to FIGS. 1-3. In this particular example, process 500 is described with respect to system 100. Briefly, according to an example, the process 500 begins with step 502 by receiving, at an energy recovery system, calcium oxide and water. For example, energy recovery system 202 or industrial plant 104 receives calcium oxide and water.

The process 500 continues with step 504 by reacting, within a reaction chamber of the carbon negative energy storage system, the calcium oxide and water to release heat and generate calcium hydroxide. For example, energy recovery system 202 or industrial plant 104 reacts the calcium oxide and water to release heat and generate calcium hydroxide.

The process 500 continues with step 506 by loading the calcium hydroxide into a marine vessel ballast tank to create a slurry of ballast water and the calcium hydroxide. For example, the calcium hydroxide can be mixed into seawater within tank 402 to create a slurry of calcium hydroxide and water that is highly basic and provides a hostile environment for invasive species that may be in the seawater.

The process 500 concludes with step 508 by discharging at least a portion of the slurry of ballast water into the ocean. For example, the slurry can be diluted by dilution system 406 to a harmless pH before it is discharged from tanks 402, 404a, 404b, or 404c into the ocean, sequestering $CO_2$.

Figure 6A:
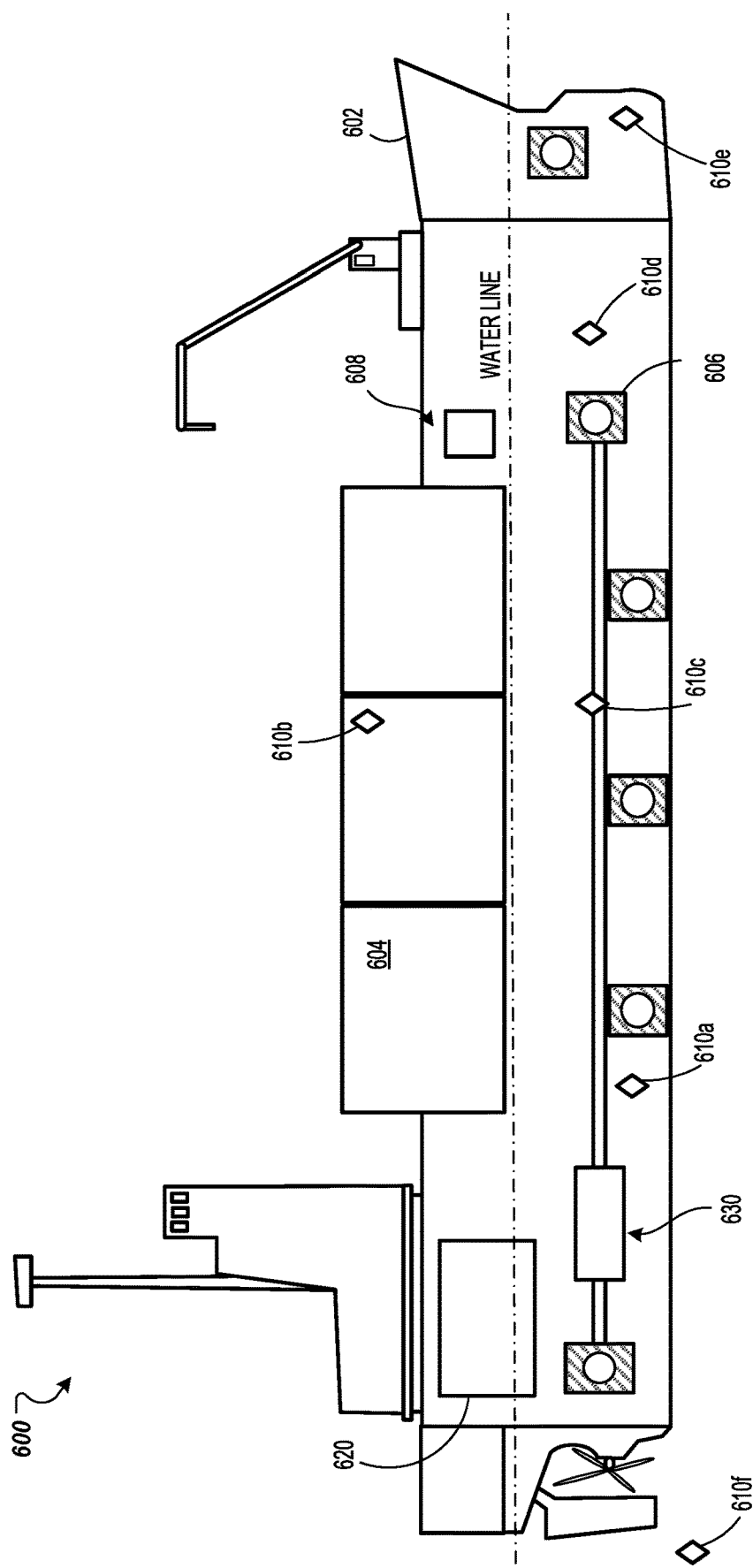
FIGS. 6A and 6B are diagrams of example configurations of a control system for ocean chemistry modification.

FIG. 6A is a diagram of an example configuration of control system for ocean chemistry modification 600. System 600 determines appropriate levels of chemicals to be dispensed into the ocean and controls the dispensation of such chemicals according to a target level of chemical concentration and other parameters to sequester $CO_2$, reducing atmospheric concentrations of carbon. System 600 includes a marine vessel 602, cargo 604, sensing system 608, control system 620, and material dispensing system 630.

Marine vessel 602 is a marine vessel, such as a ship, that travels in the ocean. Marine vessel 602 can be any of various types of ships. In this particular example, marine vessel is a cargo ship that transports cargo containers 604 across the ocean. Cargo containers 604 can range from full to empty and can be filled with cargo for transport, materials to be dispensed into the ocean, and water for mixing with the materials to be dispensed, among other substances.

Marine vessel 602 is a ship on which the energy generation systems and methods of FIGS. 1-5 can be implemented. For example, the carbon negative energy generation systems and the applications in which they are integrated as described with respect to FIGS. 1-5 can be implemented as the propulsion system for marine vessel 602 and integrated with material dispensing system 630. In some implementations, cargo 604 being carried by marine vessel 602 can include the calcium oxide 102 or other inputs (such as Ca, Mg, or MgO). In some implementations, energy recovery system 202 can be implemented as part of control system 620.

Marine vessel 602 is shown to include hatches or ports 606 to the outside of the marine vessel 602. These ports 606 allow for the expulsion of substances from within marine vessel 602 into the ocean and for the intake of substances from outside the marine vessel 602 into the marine vessel 602. The ports can be located at any point along marine vessel 602, such as the bow, along the hull, and the stern.

Marine vessel 602 can include a supply of materials to be dispersed into the ocean. For example, marine vessel 602 can house a supply of calcium-containing materials such as Ca or CaO or magnesium-containing materials such as Mg or MgO that can be released into seawater to increase seawater alkalinity. Calcium and/or calcium oxide can be stored in its solid state, for example, in powder or chunk form. Calcium and/or calcium oxide can be stored, for example, in a tank or other storage container. In some implementations, magnesium and/or magnesium oxide can be used in place of calcium and/or calcium oxide. In some implementations, the calcium-containing material can include $Ca(OH)_2$ or calcium hydroxide and the magnesium-containing materials include $Mg(OH)_2$ or magnesium oxide.

In order to achieve a particular concentration of chemical mixture to be released into the ocean, system 600 can mix the calcium-containing materials with water. Water can be obtained from, for example, the ocean. Marine vessel 602 can pump ocean water into system 600. By sourcing one of the reactants of the propulsion system from its current location, marine vessel 602 can reduce or eliminate fuel weight and allocate more weight to cargo. In some implementations, water can be obtained from the ocean through a high pressure outlet. In some implementations, water can be pumped into system 600. In some implementations, water can be stored in a tank or other storage container within marine vessel 602.

In some implementations, marine vessel 602 can include a backflow prevention system that prevents the backflow of water into the material to be dispersed. Because the reaction of materials such as calcium oxide and water is a source of energy, a backflow prevention system prevents wasted energy from unnecessary reactions. Additionally, a backflow prevention system acts as a safety measure against unexpected reactions occurring within a portion of system 600 that is not, for example, pressurized or designed to withstand the heat of reactions between water and materials such as calcium oxide.

Sensing system 608 is configured to monitor water, ship, and weather parameters, among other measurable parameters.

Sensing system 608 includes sensors 610a, 610b, 610c, 610d, 610e, and 610f (collectively referred to as sensors 610). Each of sensors 610 can be a single sensor of a particular type or an array of sensors. Sensors 610 can be placed in various positions along and around marine vessel 602. For example, sensor 610f can be a trailing array of sensors that travels behind marine vessel 602 in its wake. Sensors 610 can be placed along the hull of marine vessel 602 on the outside, by the propeller of marine vessel 602, and inside of various cargo containers 604 aboard marine vessel 602, among other locations.

Sensors 610 detect, for example, water parameters, ship parameters, and weather parameters. Water parameters include current data, water temperatures, saturation levels of various chemicals, and $O_2$ levels, among other parameters associated with the water in which marine vessel 602 is located. Ship parameters include absolute velocity and water velocity of marine vessel 602, engine state, direction of travel, and propeller speed, among other parameters associated with marine vessel 602 itself. Weather parameters include wind speed and direction, wave data, tide data, solar radiation data, circulation patterns, cloud cover, and the weather forecast, among other parameters associated with the weather and environmental conditions. Sensors 610 can also detect environmental factors such as seafloor topography and perform remote sensing of target areas. For example, sensors 610 can monitor the pH levels of a target area such as a coral reef to protect the particular chemical concentration levels required in that area. Data from sensing system 608 can be analyzed to generate data such as mass spectrometry.

Detection can be done using electrical, optical, and/or magnetic techniques by sensors such as accelerometers, gyroscopes, magnetometers, inertial measurement units (IMUs), GPS, electromyography (EMG), mechanomyography (MMG), visual sensors, depth sensors, and/or encoders, among other types of detection techniques. Sensors 610 can include velocity sensors, temperature sensors, infrared sensors, sonar sensors, pH sensors, and bio parameter sensors, among other types of sensors.

In one example, sensor 610f is an array of sensors trailing marine vessel 602 that measures the ocean chemistry of the water in the wake of marine vessel 602. This trailing water chemistry data can be used, for example, as feedback to system 600 to adjust the control instructions provided to material dispensing system 630.

In some implementations, sensors 610 can include sensors that monitor environmental parameters such as approaching macrofauna such as whales, dolphins, and fish, among other forms of aquatic life. For example, sensors 610 can include a sonar array that provides data to system 600, where system 600 implements an immediate response to detection of an approaching whale. This response can include control instructions to alter the operation of material dispensing system 630 in addition to systems such as the navigation and propulsion systems of marine vessel 602.

Control system 620 includes one or more computer processors that control the operation of various components of system 600, including sensing system 608 and material dispensing system 630 and components external to system 600, including systems that are integrated with or communicably connected to system 600, such as satellites, remote computing devices, and other marine vessels, among other systems.

Control system 620 generates control signals for system 600 locally. The one or more computer processors of control system 620 continually and automatically determine control signals for the system 600 without communicating with a remote processing system. For example, control system 620 can receive ocean chemistry feedback data from sensors 610 in response to actions taken by material dispensing system 630 and process the data to determine and generate control signals for material dispensing system 630 to alter or maintain a target level of ocean chemistry or an area into which material is dispensed.

Control system 620 uses models including machine learning models and/or finite element models to predict ocean flow, mixing, chemical dispersion, and plume patterns, among other processes. Control system 620 is configured to determine mixing and output instructions for material dispersion system 130 according to target parameters such as ocean chemistry levels. For example, control system 620 can automatically determine an optimal concentration of seawater to chemicals needed to produce a desired ocean chemistry concentration in the wake of marine vessel 602.

Control system 620 controls sensors 610 to collect and/or record data associated with the movement of marine vessel 602, ocean chemistry, weather, and water conditions surrounding marine vessel 602, among other measurable parameters. For example, sensors 610 can collect and/or record data associated with upwelling in a particular geographic area. Sensors 610 can also measure movement and activity through optical, electrical, and magnetic techniques, among other detection techniques.

Control system 620 is communicatively connected to sensing system 608 and material dispensing system 630. In some implementations, control system 620 is connected to sensing system 608 and material dispensing system 630 through communications buses with sealed conduits that protect against solid particles and liquid ingress. In some implementations, control system 620 transmits control signals to components of system 600 wirelessly through various wireless communications methods, such as RF, sonic transmission, electromagnetic induction, etc.

Control system 620 can receive feedback from sensing system 608. Control system 620 can use the feedback from sensing system 608 to adjust subsequent control signals to system 600.

Control system 620 can be communicatively connected to sensors other than sensors 610, such as sensors external to the system 600, and can use the data collected by sensors external to the system 600 in addition to the data collected by sensors 610 to generate control signals for the system 600. For example, control system 620 can be communicatively connected to external weather monitoring systems, observation satellites, or GPS satellites that are external to the system 600. Control system 620 can also receive sets of data such as surveys of migration patterns of aquatic life and real-time data such as data collected by networks of buoys.

Control system 620 uses the sensor data to generate control signals for material dispensing system 630. For example, control system 620 can determine that a particular area is protected and use GPS to enforce geofencing technology, preventing the release and/or propagation of materials into the particular area. Control system 620 can, for example, receive a predetermined set of protected areas.

Control system 620 can detect that a particular area should be protected or restricted. For example, if control system 620 determines, based on data from sensing system 608, that there is a port, control system 620 can automatically designate an area as protected or restricted.

Material dispensing system 630 is configured to dispense substances from marine vessel 602 into the surrounding water. Material dispensing system 630 is configured for integration with marine vessel 602. Material dispensing system 630 includes various subsystems configured for the mixing and expelling of substances from marine vessel 602. Subsystems of material dispensing system 630 can be placed in various positions along marine vessel 602.

Material dispensing system 630 can include, for example, a mixing subsystem that can mix precise proportions of water and calcium in powder form onboard marine vessel 602. The mixing subsystem can mix substances from different sources. For example, material dispensing system 630's mixing subsystem can mix seawater drawn into marine vessel 602 through ports 606 with calcium oxide stored onboard marine vessel 602. The mixing subsystem includes components configured to perform mixing and pumping, among other actions. Material dispensing system 630's mixing subsystem can dispense a calculated portion of substances directly into seawater. For example, control system 620 can generate control signals for material dispensing system 630 to dispense an amount of calcium oxide into the seawater surrounding marine vessel 602 to be mixed with the turbulence and upwelling in the water according to a target chemical concentration level.

Material dispensing system 630 can include, for example, a dispensing subsystem that can expel substances from marine vessel 602. The dispensing subsystem can expel substances from marine vessel 602 through various openings in marine vessel 602 such as the ports 606, which are placed in various positions along marine vessel 602, or specialized openings in marine vessel 602. For example, material dispensing system 630 can independently dispense substances through each of the ports 606. Material dispensing system 630 can dispense substances through multiple ports 606 at the same time. The dispensing subsystem includes components configured to perform expulsion of particular amounts of substances with particular force at a particular rate. These substances can be mixed onboard marine vessel 602 or can be expelled to be mixed with seawater. For example, the dispensing subsystem can expel a calculated amount of calcium powder at a particular rate over a particular period of time with a calculated amount of force from a port 606 of marine vessel 602 to be mixed with the turbulence in the wake of marine vessel 602.

In one example, material dispensing system 630 can pump a mixture of seawater drawn into marine vessel 602 and calcium through the shaft of the marine vessel 602's propeller and release the substance through the blades of the propeller of marine vessel 602 such that the mixture is further mixed by the propeller. In another example, material dispensing system 630 can eject calcium oxide into the wake of marine vessel 602 with a calculated force.

Figure 6B:
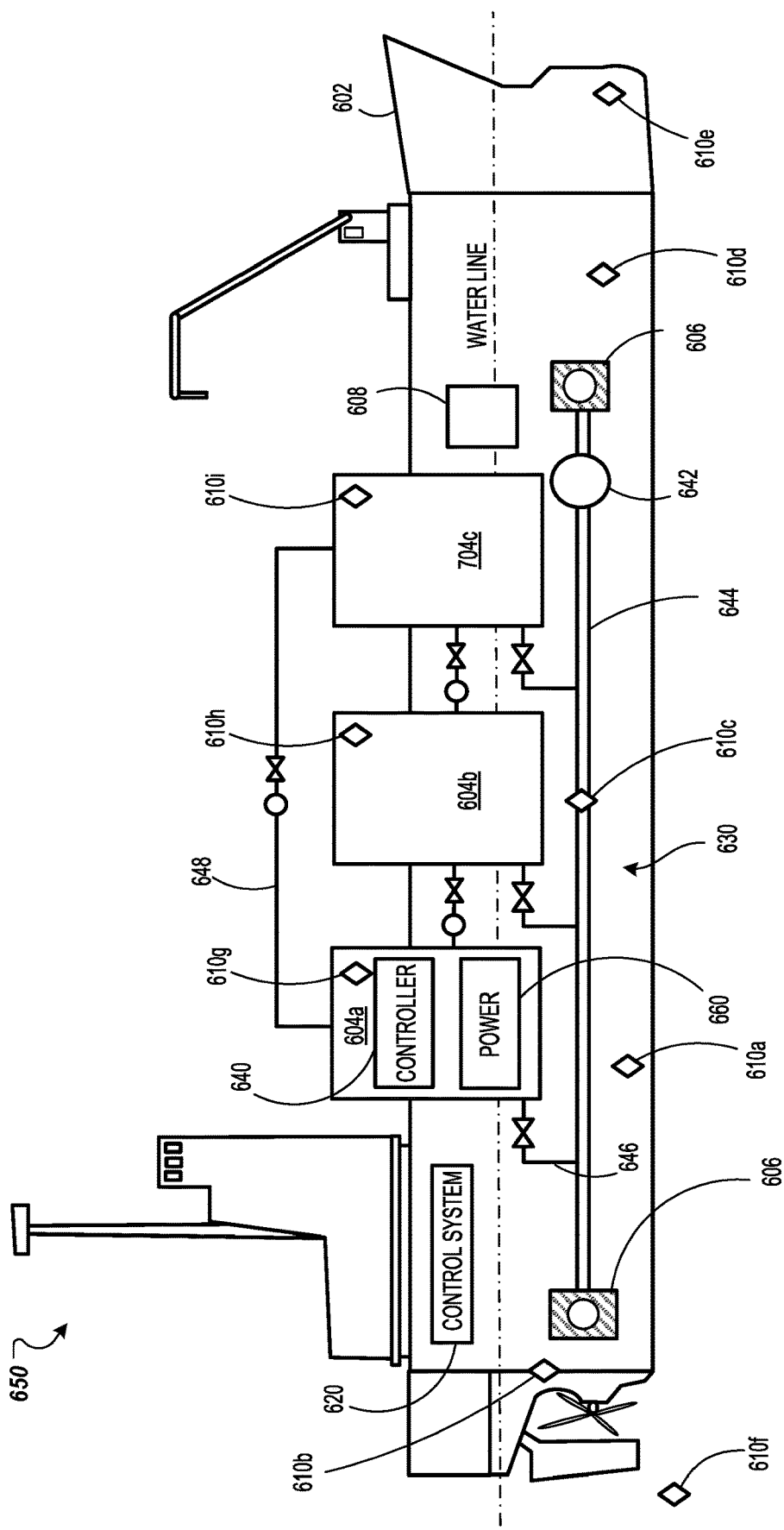

FIG. 6B is a diagram of an example configuration of control system for ocean chemistry modification 650. System 650 is similar to system 600 as described with respect to FIG. 6A, and includes additional elements. System 650 additionally includes container controller 640, and power system 660.

Cargo containers 604 are fitted with a protective bladder layer that protects the containers from corrosive effects of the calcium-containing material stored in the container. The calcium-containing material generally needs to be stored as a slurry (mixture of seawater and calcium-containing material) or in a pure powder form.

Figure 10B:
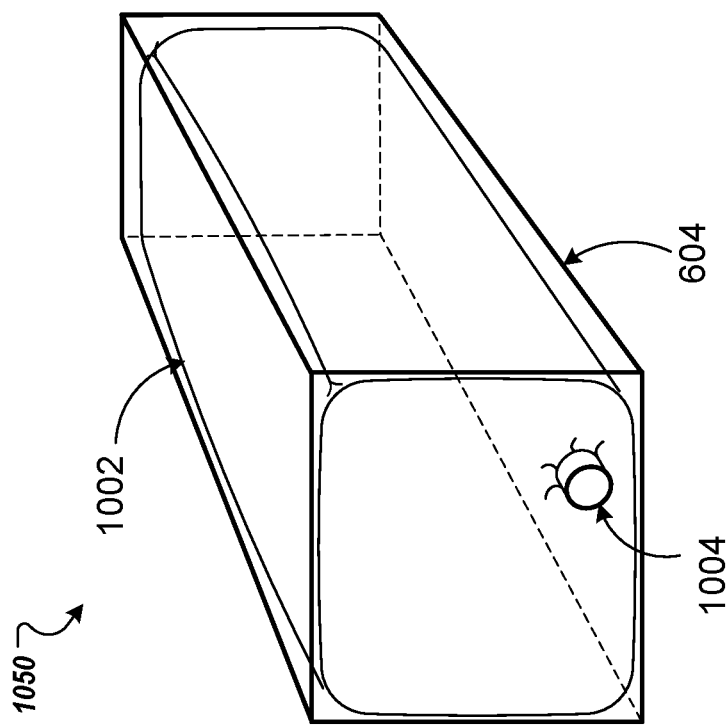
FIGS. 10A and 10B are different views of a standards-compliant shipping container outfitted with a protective bladder.
Figure 10A:
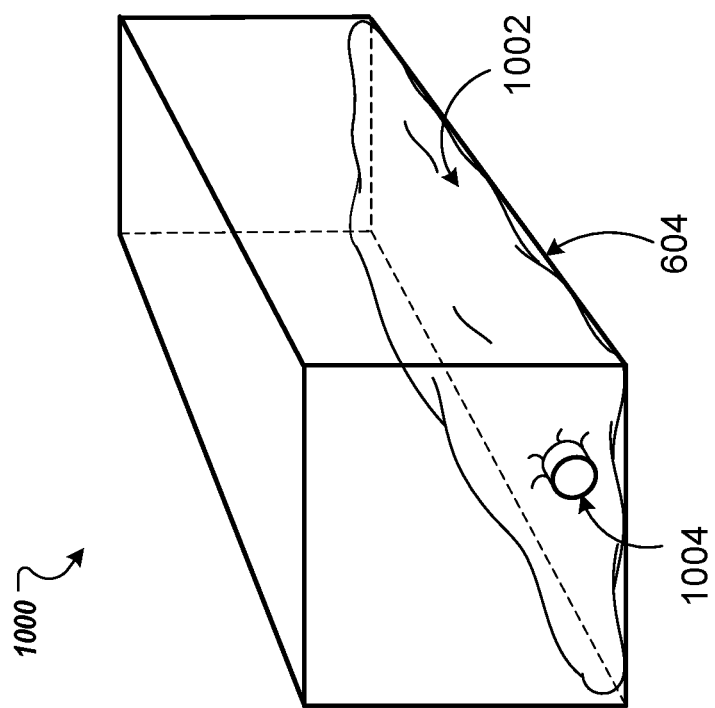

The protective bladder, described in further detail with respect to FIGS. 10A and 10B, is a flexible bladder that can be fit into standards-compliant cargo containers such that the containers are usable for shipping normal cargo and also for storing calcium-containing materials that can be used for ocean chemistry modification.

In some implementations, the calcium-containing material can be stored within portions of marine vessel 602 used for stability and ballasting. For example, marine vessel 602's ballast tanks can also be fitted with protective bladders and filled with a dry form of the calcium-containing material or a diluted slurry of the calcium-containing material.

The ballast is a component that provides stability to marine vessel 602, preventing marine vessel 602 from listing. The ballast weight generally remains below water level, and counteracts the effects of weight of marine vessel 602 above water level.

Marine vessel 602 is shown to include hatches or ports 606 to the outside of the marine vessel 602. These ports 606 allow for the expulsion of substances from within marine vessel 602 into the ocean and for the intake of substances from outside the marine vessel 602 into the marine vessel 602. The ports can be located at any point along marine vessel 602, such as the bow, along the hull, and the stern.

Marine vessel 602 can include a supply of materials to be dispersed into the ocean. For example, marine vessel 602 can house a supply of calcium-containing materials such as Ca or CaO or magnesium-containing materials such as Mg or MgO that can be released into seawater to increase seawater alkalinity. Calcium and/or calcium oxide can be stored in its solid state, for example, in powder or chunk form. Calcium and/or calcium oxide can be stored, for example, in a tank or other storage container. In some implementations, magnesium and/or magnesium oxide can be used in place of calcium and/or calcium oxide. In some implementations, the calcium-containing material can include $Ca(OH)_2$ or calcium hydroxide and the magnesium-containing materials include $Mg(OH)_2$ or magnesium oxide.

In order to achieve a particular concentration of chemical mixture to be released into the ocean, system 660 can control the mixing of the calcium-containing materials with water. Water can be obtained from, for example, the ocean. Marine vessel 602 can pump ocean water into system 660. By sourcing one of the reactants of the propulsion system from its current location, marine vessel 602 can reduce or eliminate fuel weight and allocate more weight to cargo. In some implementations, water can be obtained from the ocean through a high pressure outlet. In some implementations, water can be pumped into system 660. In some implementations, water can be stored in a tank or other storage container within marine vessel 602.

In some implementations, marine vessel 602 can include a backflow prevention system that prevents the backflow of water into the material to be dispersed. Because the reaction of materials such as calcium oxide and water is a source of energy, a backflow prevention system prevents wasted energy from unnecessary reactions. Additionally, a backflow prevention system acts as a safety measure against unexpected reactions occurring within a portion of system 660 that is not, for example, pressurized or designed to withstand the heat of reactions between water and materials such as calcium oxide.

In one example, sensor 610f is an array of sensors trailing marine vessel 602 that measures the ocean chemistry of the water in the wake of marine vessel 602. This trailing water chemistry data can be used, for example, as feedback to system 660 to adjust the control instructions generated by and/or provided to control system 620, material dispensing system 630, and container controller 640.

In one example, sensors 610g, 610h, and 610i are sensors placed within cargo containers 604. Sensors 610g, 610h, and 610i can each be an array of sensors that measure the conditions within a respective cargo container 604. For example, sensors 610g, 610h, and 610i can be sensors that measure the chemical concentration of the mixture of seawater and calcium-containing material within a respective cargo container 604. Seawater composition is variable, and sensors placed within cargo container 604 can be used to monitor the chemical composition of the contents of that container. This data can be used as feedback to control system 620, material dispensing system, and container controller 640. By monitoring the conditions within a particular cargo container 604, for example, system 660 can ensure that mixing is done according to a target chemical concentration and prevent undersaturation or oversaturation of the calcium-containing material to be mixed with seawater.

In some implementations, sensors 610 can include sensors that monitor environmental parameters such as approaching macrofauna such as whales, dolphins, and fish, among other forms of aquatic life. For example, sensors 610 can include a sonar array that provides data to system 660, where system 660 implements an immediate response to detection of an approaching whale. This response can include control instructions to alter the operation of material dispensing system 630 in addition to systems such as the navigation and propulsion systems of marine vessel 602.

Control system 620 includes one or more computer processors that control the operation of various components of system 660, including sensing system 108, material dispensing system 630, container controller 640, and components external to system 660, including systems that are integrated with or communicably connected to system 660, such as satellites, remote computing devices, and other marine vessels, among other systems.

In some implementations, container controller 640 is a part of, or integrated with, material dispensing system 630. For example, functions performed by container controller 640 can be described as functions of material dispensing system 630 generally. Container controller 640 can also be a self-contained controller separate from material dispensing system 630.

Container controller 640 generates control signals to control and manage the contents of cargo containers 604 onboard marine vessel 602. For example, container controller 640 generates control signals for container-pump connections and container-container connections, collectively referred to as container control components. The one or more computer processors of container controller 640 continually and automatically determine control signals for cargo containers without communicating with a remote processing system. For example, container controller 640 can receive ocean chemistry feedback data from sensors 610 in response to actions taken by the container control components and process the data to determine and generate control signals for the container control components to alter or maintain a target level of chemical concentration, mass, or density, among other parameters, of substances within cargo containers 604.

Container controller 640 can control a mixing subsystem within cargo containers 604 that can mix precise proportions of water and calcium-containing material onboard marine vessel 602. The mixing subsystem can mix substances from different sources. For example, container controller 640's mixing subsystem can mix seawater drawn into marine vessel 602 through ports 606 with calcium oxide stored onboard marine vessel 602. The mixing subsystem includes components configured to perform mixing and pumping, among other actions. The mixing subsystem can draw substances from cargo containers 604, the water surrounding marine vessel 602, and other containers onboard marine vessel 602.

The mixing subsystem includes, for example, pump 642, piping 644, container-pump connections 646, and container-container connections 648.

Pump 642 is a pump that moves substances through, into, and out of marine vessel 602. Pump 642 can be an existing pump onboard marine vessel 602, such as a bilge pump, a fire main pump, or a circulating pump, among other types of pumps found onboard marine vessels. In some implementations, pump 642 can include a system of pumps. In some implementations, pump 642 is the main pump of the mixing subsystem and draws substances from cargo containers 604 to be ejected from marine vessel 602 by material dispensing system 630.

Piping 644 can be existing piping on marine vessel 602. Piping 644 can be rigid piping such as copper or other metal piping. In some implementations, piping 644 can be flexible piping such as flow lines or tubing. For example, piping 644 can be ship-based piping such as piping that is part of an existing seawater ballast system or a fire main system. Cargo containers 604 are connected to each other, to container controller 640, and to pump 642 via piping 644.

Container-pump connections 646 and container-container connections 648 are herein collectively referred to as the container control components 646 and 648.

Container-pump connections 646 are connections between a particular cargo container 604 and pump 642. Container-pump connections 646 include piping and a valve. In some implementations, container-pump connections 646 include a pump that can be considered part of pump 642 or can be separate from pump 642. Container-pump connections 646 connect cargo containers 604 to the main pipeline to pump 642. In some implementations, container-pump connections are a connection point between cargo containers 604 and material dispensing system 630.

Container-container connections 648 are connections between a particular cargo container 604 and another cargo container 604. Container-container connections 648 include piping and a valve. In some implementations, container-container connections 646 include a pump that can be considered part of pump 642 or can be separate from pump 642. Container-container connections 648 connect cargo containers 604 to each other and allow for container controller 640 and the mixing subsystem to move substances between cargo containers 604 in addition to mixing substances in and ejecting substances from cargo containers 604.

Whether and the order in which container controller 640 fills and empties cargo containers 604 with seawater and mixes calcium-containing material with the seawater can affect the stability of marine vessel 602 and its ballasting.

In some implementations, instead of mixing the substances onboard marine vessel 602, material dispensing system 630 can dispense a calculated portion of substances directly into seawater. For example, control system 620 can generate control signals for material dispensing system 630 to dispense an amount of calcium oxide into the seawater surrounding marine vessel 602 to be mixed with the turbulence and upwelling in the water according to a target chemical concentration level.

In some implementations, system 660 includes a single cargo container 604 designated for mixing that draws in seawater, titrates the calcium-containing material according to a target chemical parameter, and ejects the mixture. For example, container controller 640 can control the mixing of seawater and calcium-containing material to achieve a target pH within a single designated mixing cargo container 604 and eject the mixture from the single cargo container 604. This method allows other piping 644 in system 660 to have less stringent pH ratings, reducing the costs associated with implementing system 660.

In some implementations, container controller 640 controls other subsystems of marine vessel 602. For example, container controller 640 can control a ballasting system of marine vessel 602, where the ballast tank can be controlled in a manner similar to that of the cargo containers 604, and can be referred to as a container. For example, container controller 640 can maintain ship stability by moving mass from higher-elevation cargo containers 604 to lower-elevation cargo containers 604 prior to adding additional seawater. In some implementations, container controller 640 can control cargo containers 604 to provide a ballasting effect, circumventing the existing ballasting system.

Container controller 640 uses models including machine learning models and/or finite element models to simulate the mixing and shifting of substances within and between cargo containers 604, among other processes. Container controller 640 is configured to determine mixing instructions to create a slurry of calcium-containing material and seawater according to target parameters such as ocean chemistry levels, chemical concentrations, and ship stability and ballasting needs. For example, container controller 640 can automatically determine an optimal ratio of seawater to chemicals needed to produce a desired chemical concentration. Container controller 640 can automatically determine an optimal distribution of substances between cargo containers 604 according to a target ballast weight distribution.

Container controller 640 controls sensors 610 to collect and/or record data associated with the mixing and moving of substances within and between cargo containers 604 and chemical concentration of seawater surrounding marine vessel 602, among other measurable parameters. Sensors 610 can also measure movement and activity through optical, electrical, and magnetic techniques, among other detection techniques.

Container controller 640 is communicatively connected to sensing system 108, control system 620, and material dispensing system 630. In some implementations, control system 620 is connected to sensing system 108, control system 620, and material dispensing system 630 through communications buses with sealed conduits that protect against solid particles and liquid ingress. In some implementations, container controller 640 transmits control signals to components of system 660 wirelessly through various wireless communications methods, such as RF, sonic transmission, electromagnetic induction, etc.

Container controller 640 can receive feedback from sensing system 108. Container controller 640 can use the feedback from sensing system 108 to adjust subsequent control signals to system 660.

Container controller 640 can be communicatively connected to sensors other than sensors 610, such as sensors external to the system 660, and can use the data collected by sensors external to the system 660 in addition to the data collected by sensors 610 to generate control signals for the system 660. For example, container controller 640 can be communicatively connected to external weather monitoring systems, observation satellites, or GPS satellites that are external to the system 660. Control system 620 can also receive sets of data such as surveys of migration patterns of aquatic life and real-time data such as data collected by networks of buoys.

Container controller 640 allows for the modular implementation of system 660. Container controller 640 controls each cargo container 604 independently and can provide separate control signals to each cargo container 604 and its associated container control components 646, 648. For example, if a particular cargo container 604 is removed from system 660, container controller 640 can detect this removal and continue controlling system 660, accounting for the removal of the particular cargo container 604. In some implementations, container controller 640 can receive data indicating that a container has been removed, added, relocated, or otherwise changed, and container controller 640 can automatically determine what changes, if any, need to be implemented in the control of system 660.

Power system 660 is an onboard power system that provides power to the container controller 640. In some implementations, power system 660 also provides power to control system 620, mixing system 630, pump 642, and container control components 646 and 648. In some implementations, power system 660 can be integrated with, or can act as the main power system for marine vessel 602 to provide power for the navigation and propulsion systems.

Power system 660 can include generators. For example, power system 660 can use a heat sink engine, using cold ocean water driven to deeper depths for driving its heat exchange; ocean thermal energy conversion (OTEC); solar power; or other renewable energy systems, such as wind, nuclear, etc. In some implementations, power system 660 can use, among other types of fuel, the calcium-containing material to generate electric power.

As depicted in FIG. 6B, container controller 640 and power system 660 are housed within a particular cargo container 604a. In some implementations, container controller 640 and/or power system 660 can be separate from cargo container 604a.

FIG. 7 is an example data flow 700 for a control system for ocean chemistry modification. The process shown in data flow 700 can be performed locally or remotely. In some implementations, the process shown in data flow 700 is performed exclusively onboard marine vessel 602. In some implementations, the process shown in data flow 700 can be performed by a distributed computing system over a network connection such as the Internet. In some implementations, the process shown in data flow 700 is performed by control system 920, as described below with respect to FIG. 9, exclusively onboard a single material dispensing module 906. The process shown in data flow 700 can also be performed by control system 920, implemented as a distributed computing system over a network connection such as the Internet.

Additionally, data flow 700 illustrates the process of forecasting ocean conditions such that the material dispensing system 904 releases lime to maintain a pH level within some threshold amount of a target level in a particular geographical region. For example, data flow 700 can illustrate the process of forecasting ocean conditions to inform the control of material dispensing system 904 to dispense calcium oxide to maintain an acidity level appropriate for calcifying organisms 902, a coral reef. Data flow 700 allows a system to model how material that is released mixes and disperses over a region of interest, such as a seawater region surrounding or near calcifying organisms 902.

As described above with respect to FIGS. 6A and 6B, system 600 includes a control system 620 that uses models to determine appropriate amounts of material to be mixed and/or released by material dispensing system 630. For example, control system 620 models water movement surrounding marine vessel 602 based on parameters detected by sensing system 608 and determines control signals for material dispensing system 630 or the modules.

Examples 702 are provided to training module 710 as input to train various models. Examples 702 can be positive examples (i.e., examples of correctly determined chemical concentration levels, upwelling patterns, turbulence, etc.) or negative examples (i.e., examples of incorrectly determined chemical concentration levels, upwelling patterns, turbulence, etc.).

Examples 702 include the ground truth, or a particular parameter defined, or confirmed, as the correct parameter. Examples 702 include sensor information such as baseline current patterns, turbulence flow, etc. For example, examples 702 can include chemical dispersion levels as detected by sensors 610 or sensors external to system 100 as described above.

The ground truth indicates the actual, correct parameter of a particular measurable factor. For example, a ground truth plume pattern can be generated and provided to training module 710 as an example 702 by modeling a plume and its movements and subsequently measuring the characteristics of the plume and its movements and confirming that the model was correct. In some implementations, a human can manually verify the outputs of the model. The correct parameter can be automatically detected and labelled by pulling data from a data storage medium that contains verified predicted parameters.

The ground truth parameters can be correlated with particular inputs of examples 702 such that the inputs are labelled with the ground truth parameters. With ground truth labels, training module 710 can use examples 702 and the labels to verify model outputs and continue to train the predictor to improve forward modelling of processes such as water motion and chemical dispersion through data collected by sensing system 608 to model the processes. For example, a ground truth plume pattern can be generated and provided to training module 710 as an example 702 by modeling a plume and its movements and subsequently measuring the characteristics of the plume and its movements and confirming that the model was correct. In some implementations, a human can manually verify the outputs of the model. The correct parameter can be automatically detected and labelled by pulling data from a data storage medium that contains verified predicted parameters.

The ground truth parameters can be correlated with particular inputs of examples 702 such that the inputs are labelled with the ground truth parameters. With ground truth labels, training module 710 can use examples 702 and the labels to verify model outputs and continue to train the predictor to improve forward modelling of processes such as water motion and chemical dispersion through data collected by sensing system 608 to model the processes.

Training module 710 trains models to perform process predictions. For example, training module 610 can train control system 620 to update and improve modelling of upwelling in the ocean. Training module 710 refines control system 620's models using data collected by sensing system 608. Training module 710 allows control system 620 to use complex modelling results, such as a predicted pattern of upwelling in addition to simple predictions such as patterns of turbulence in the wake of marine vessel 602 or due to movement of material dispensing modules. Models 712 can include various types of models, such as finite element models, neural networks, etc. Models 712 can be three-dimensional hydrodynamic models with variational parameterization. These models use dynamic parameterization to optimize and assess model accuracy. Models 712 can include various types of models, such as finite element models, neural networks, etc.

Inputs to models 712 can include water, weather, ship, and environmental parameters as described above with respect to FIGS. 1-6B. For example, models 712 can accept inputs such as wind conditions, weather conditions, cloud cover, current patterns, directions, and strength, tide patterns, ocean chemistry saturation, biological parameters of the calcifying organisms, material dispensing module parameters such as direction of travel and velocity, the sea state, seafloor topography, and sonar data. Inputs can include local data and data collected for more remote locations. Inputs can include actual release data measured by sensing system 608 from material dispensing modules, including the actual direction, rate, and amount of material released, among other parameters. Inputs can include data from fixed-position sensors of sensing system 608, data from sensors external to sensing system 608, such as ship or weather service sensors.

Training module 710 trains control system 620 using models 712 that can include objective functions. Models 712 can model various processes. For example, models 712 can model plumes of chemistry near marine vessel 602 or calcifying organisms and components of the material dispensing system. Control system 620 can use the outputs of these models to generate control signals for material dispensing system 630 to release appropriate amounts of a substance according to a preferred environmental threshold, such as a pH threshold.

Models 712 can model plumes of chemistry at timescales of hours, weeks, etc. Control system 620 can use these models 712 to determine appropriate amounts of material to be released by material dispensing system 630 according to a preferred environmental threshold such as a dispersion level. For example, with ocean currents perpendicular to marine vessel 602's direction of travel, a larger amount of a substance should be released to achieve a particular chemical concentration level because the substance will spread away from marine vessel 602's wake.

Models 712 can model upwelling and release chemistry. For example, models 712 can model the movements of fine rock particles that are ejected into upwelling areas. Models 712 can perform forward modelling to predict future process parameters and reverse modelling to determine process parameters needed to achieve a particular result. For example, models 712 can predict a force with which calcium particles must be ejected into a particular upwelling area to have a sufficient residence time near the surface to draw down atmospheric $CO_2$.

Models 712 can model weather patterns, biological patterns of relevant organisms such as calcifying organisms, and ocean movement patterns. Models 712 can perform forward modeling to project various outcomes of control signals to the material dispensing system and select an optimal set of navigation and/or material release parameters.

Models 712 can receive input data in real-time from various sensors. For example, models 712 can receive input data from sensing system 608 in real-time, in addition to input data from sources external to sensing system 608 or the material dispensing system. In some implementations, models 712 can receive input data at intervals. In some implementations, models 712 can be coupled to or receive input from external models. For example, models 712 can be coupled to weather forecast models from a scientific agency such as the National Oceanic and Atmospheric Administration.

Training module 710 can train control system 620 manually or the process could be automated.

Training module 710 uses the models 712 and examples 702 labelled with the ground truth parameters to train control system 620 to learn what is important for each model. Training module 710 allows control system 620 to learn by changing the weights applied to different variables to emphasize or deemphasize the importance of the variable within a model. By changing the weights applied to variables within a model, training module 710 allows the model to learn which types of information (e.g., which sensor inputs, etc.) should be more heavily weighted to produce a more accurate process prediction.

The examples and variables can be weighted based on, for example, feedback from control system 620, sensing system 608, and material dispensing system 630. Training module 710 uses, for example, reinforcement learning to optimize the outputs of models 712.

Training module 710 uses machine learning techniques to train control system 620, and can include, for example, a neural network that utilizes an objective function to produce parameters used in a water motion prediction model. These parameters can be prediction parameters that define particular values of a model used by control system 620. The objective functions can include, for example, a set of target health parameters of calcifying organisms as a whole.

The training module 710 optimizes chemical concentration stabilization across a local region of interest. For example, the training module 710 can optimize control signals for material dispensing system for a local region surrounding calcifying organisms. In some implementations, the training module 710 can also optimize performance globally across two or more control systems focused on different regions surrounding different sets of calcifying organisms.

Control system 620 uses the outputs of models 712 to perform various adjustments to the control of material dispensing system 630. Outputs of control system 620 include, for example, the amount of seawater needed to be drawn onboard marine vessel 602 to be mixed with a substance according to a target chemical concentration; the amount of a mixture or pure substance to be released; the rate at which the mixture or substance is released; and a period of time over which the mixture or substance is released according to the target chemical concentration. Control system 620 can also determine the force with which a particular mixture or substance should be ejected from marine vessel 602 according to a target mixing parameter. In some implementations, control system 620 can control the operation of other systems of marine vessel 602, including the navigation and propulsion systems. For example, control system 620 can use models 712 to adjust chemical dosing parameters for material dispensing system 630 based on ship parameters. Control system 620 can use models 712 to predict, control, and optimize dilution near the ship and overall ocean chemistry through control signals to material dispensing system 630. In some examples, control system 620 can use models 712 to optimize the movement or stabilization of material dispensing modules, such as material dispensing modules 906. For example, the material dispensing modules can be controlled to compensate for tidal movement, bidirectional currents, extreme weather, and passing marine vessels and macrofauna, among other events. Control system 620 can use models 712 to predict, control, and optimize pathways for the material dispensing modules to maintain local ocean chemistry through control signals to the navigation systems of the modules.

Control system 620 can use the output of models 712 to enforce the geographically restricted release of chemicals. For example, control system 620 can implement a geofencing system by using geographical data collected by sensing system 608 to determine a physical perimeter for a protected or restricted area and restrict the release of the chemicals through material dispensing system 630 based on the perimeter. For example, control system 620 can refrain from releasing chemicals in areas such as port, protected marine areas, and areas too close to shore. In one example, control system 620 can determine, based on the output of models 712, that any released materials are likely to disperse into a restricted area even if the materials are not released in the restricted area, and can refrain from releasing the materials through material dispensing system 630. For example, based on a plume model on the order of days, control system 620 can determine that any calcium released may reach a protected coral reef and can refrain from providing control signals to material dispensing system 630 to release the calcium. In some implementations, control system 620 can control systems of marine vessel 602 to control the dispersion of substances released. For example, control system 620 can control the propulsion system of marine vessel 602 to increase turbulence in a particular direction.

In some implementations, control system 620 can control the release of materials through material dispensing system 630 to the benefit of the marine vessel 602 itself. For example, if ports 106 are located along the hull of marine vessel 602 or at the bow, chemicals can be released through ports 106*c* and flow along the hull of marine vessel 602 to inhibit growth of marine life such as barnacles or hull fouling.

In some implementations, control system 620 can use models 712 to model boundary layers along marine vessel 602 and its path of travel and release substances through material dispensing system 630 according to the model outputs such that the substances adhere to the hull before dispersing. In some implementations, control system 620 can control the release of substances through material dispensing system 630 according to the model outputs to reduce drag as marine vessel 602 travels through the ocean.

In some implementations, control system 620 can use models 712 to model the acoustics of marine vessel 602. For example, control system 620 can release substances through material dispensing system 630 according to acoustic model parameters to mask the acoustics of marine vessel 602.

Figure 8:
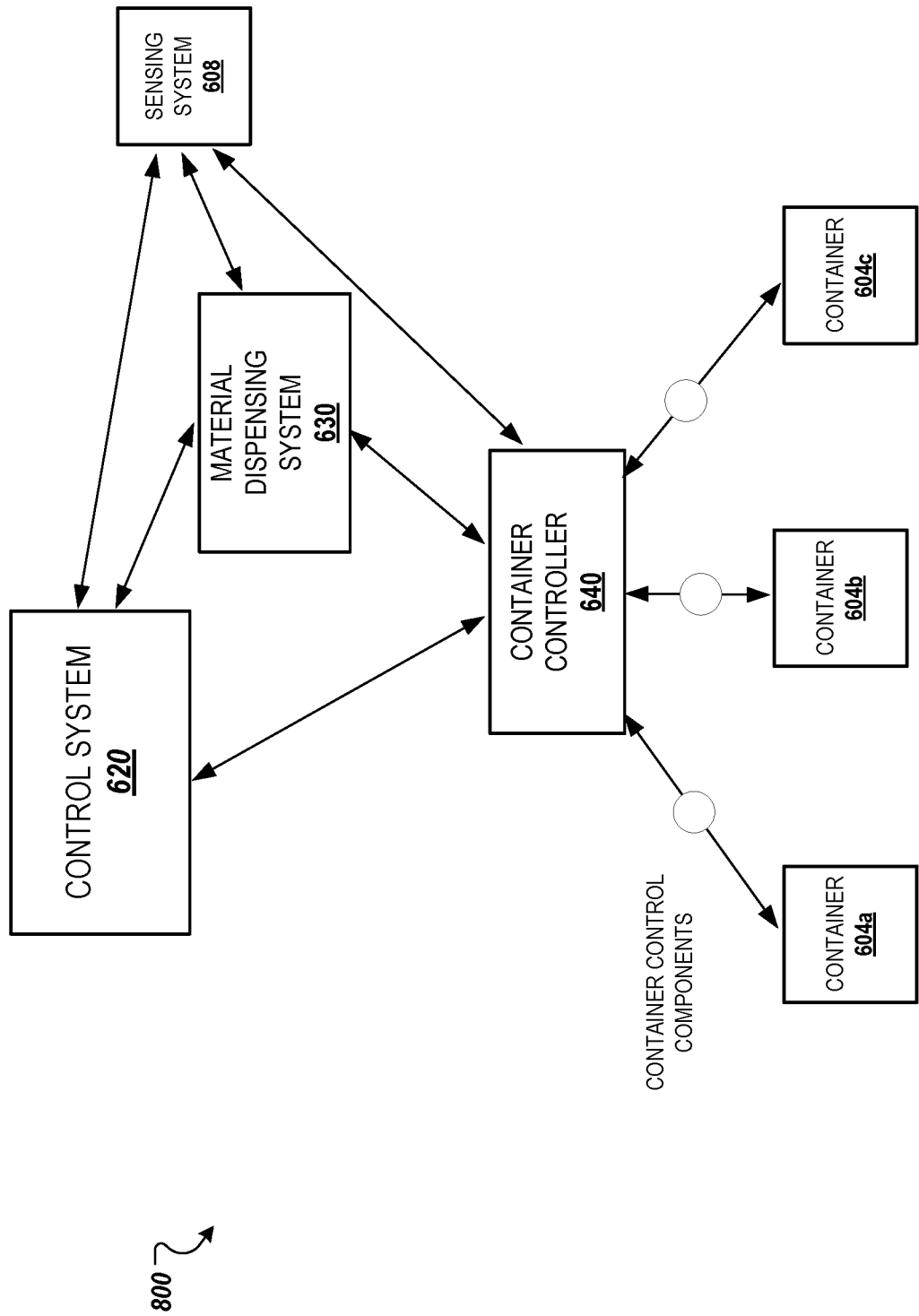
FIG. 8 is an example data flow for an active modular container system.

FIG. 8 is an example data flow for an active modular container system. The process shown in data flow 800 can be performed locally or remotely. In some implementations, the process shown in data flow 800 is performed exclusively onboard marine vessel 602. In some implementations, the process shown in data flow 800 can be performed by a distributed computing system over a network connection such as the Internet.

As described above with respect to FIG. 6B, system 660 includes a control system 620 that generates control signals indicating a target chemical concentration to be mixed and/or released by material dispensing system 630 and container controller 640. Control system 620 provides control signals to and receives feedback from material dispensing system 630 and container controller 640. Control system 620 and material dispensing system 630 can provide control signals to and receive measured data from sensing system 608. For example, the measured data from sensing system 608 can be used as input to models used by control system 620 and as feedback to material dispensing system 630.

Container controller 640 allows for system 600 to be modular, and can be compatible with various existing systems of marine vessel 602. As described above with respect to FIG. 6B, in some implementations, container controller 640 can be a component of or integral to material dispensing system 630. In some implementations, container controller 640 can be separate from material dispensing system 630. Container controller 640 can receive control signals from and provide feedback to material dispensing system 630. Container controller 640 can provide control signals to and receive measured data from sensing system 608.

Container controller 640 uses models to simulate the mixing of substances onboard marine vessel 602 for release from marine vessel 602 according to a target chemical concentration. Container controller 640 can also use models to simulate the movement of substances onboard marine vessel 602 according to a target ship stability parameter.

Container controller 640 uses various types of models, such as finite element models, neural networks, among other types. Inputs to the models can include water, weather, ship, chemical, and environmental parameters. For example, the models can receive measured values of a current chemical concentration within a particular cargo container 604, the amount of calcium-containing material mixed into a particular cargo container 604, the chemical properties of seawater drawn into a particular cargo container 604, among other parameters.

Container controller 640 uses the outputs of these models to perform various adjustments to the control of its mixing subsystem. Outputs of container controller 640 include, for example, the amount of seawater needed to be drawn onboard marine vessel 602 to be mixed with a substance according to a target chemical concentration; the amount of a calcium-containing material needed to be mixed into a particular amount of seawater according to a target chemical concentration; an amount of seawater and/or calcium-containing material needed to be shifted to a particular cargo and container or location onboard marine vessel 602 for the purposes of ship stabilization. In some implementations, container controller 640 can control the operation of other systems of marine vessel 602, including the navigation and propulsion systems.

Container controller 640 uses measured data from sensing system 608 to monitor the movement and mixing of substances within cargo containers 604. This data provides feedback to container controller 640 that can be fed into its models to perform adjustments to the control of its mixing subsystem. Container controller 640 can monitor and implement a feedback loop onboard marine vessel 602, where container controller 640 can locally update its models and control instructions to its mixing subsystem. In some implementations, container controller 640 can update a global model located remotely from system 600 that governs the operation of control system 620, material dispensing system 630, and/or container controller 640.

Container controller 640 can provide control signals to all and each of cargo containers 604. Container controller 640 can, for example, control its mixing subsystem to create a slurry of seawater and calcium-containing material according to a target chemical concentration. Container controller 640 controls the mixing subsystem, for example, by controlling the container control components 646, 648 to allow the opening and closing of connections between the cargo containers and any opening between marine vessel 602 and the surrounding seawater. Container controller 640 can control these connections by controlling valves of the container-pump connections 646 or container-container connections 648. Container controller 640 can control the movement of substances into and out of cargo containers 604 through the control of pump 642.

Figure 9:
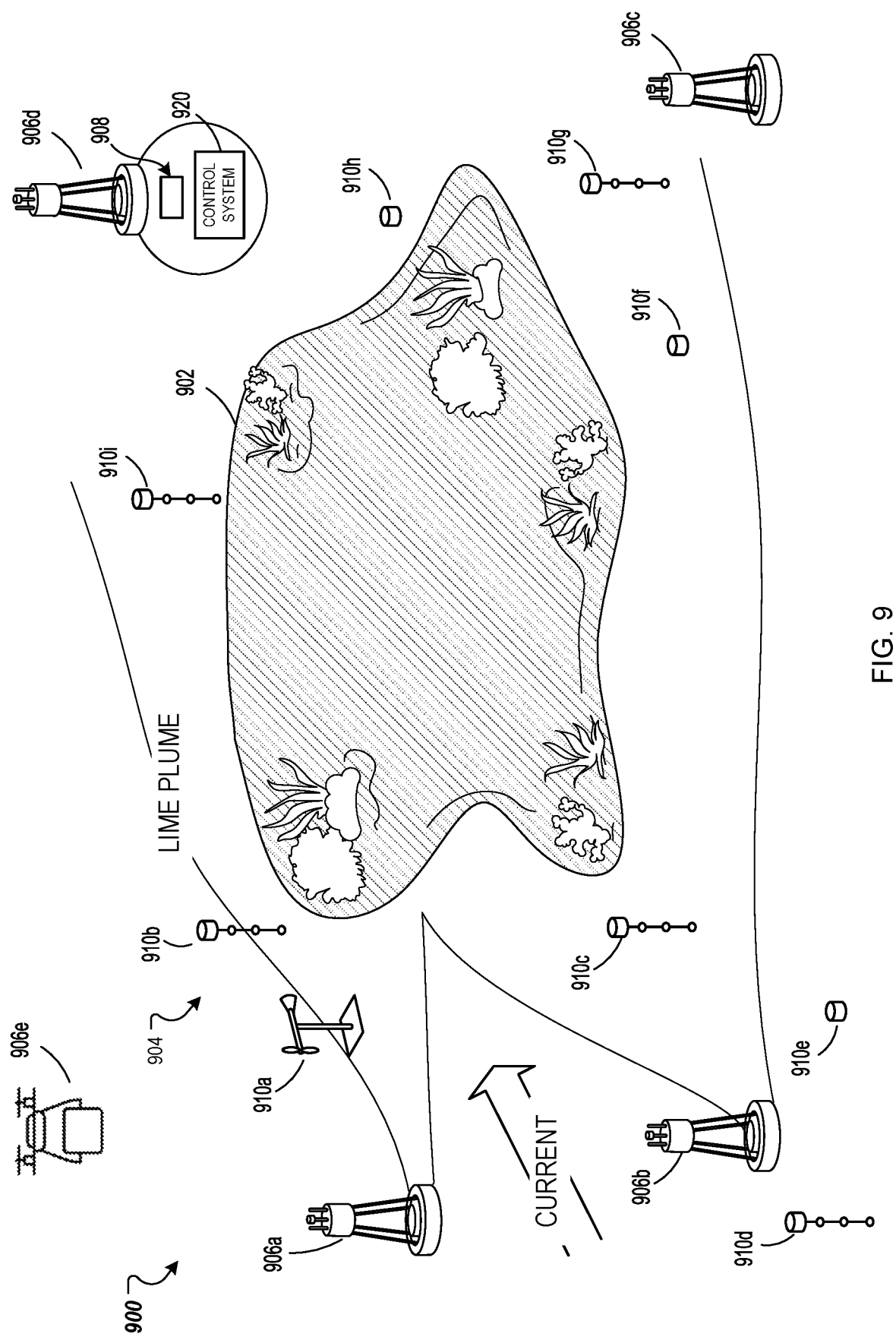
FIG. 9 is a diagram of an example configuration of a control system for ocean acidification prevention.

FIG. 9 is a diagram of an example configuration 900 of a control system for ocean acidification prevention. Configuration 900 is an example of a system that determines appropriate levels of materials and/or chemicals to be dispensed into the ocean and controls the dispensation of such materials and/or chemicals according to a target level of chemical concentration and other parameters to control the pH level of a local area of the ocean. The system includes calcifying organisms 902, material dispensing system 904, sensing system 908, and control system 920.

Marine calcifying organisms 902 are organisms that form calcium carbonate to create protective exoskeletons. Calcifying organisms 902 can also bond together to form ecosystems, such as reefs, that provide diverse species with a home. Ocean acidification presents a danger to calcifying organisms in two ways: a decrease in available carbonates (such as carbonate and bicarbonate ions) needed by the organisms to create exoskeletons and an increase in acidity that harms organisms sensitive to acidity and erodes existing exoskeletons. Calcifying organisms include, for example, mollusks, crustaceans, echinoderms, among other types of organisms.

Calcifying organisms 902 are shown to cover a specific geographical area within the ocean. For example, calcifying organisms 902 can include a congregation of calcifying organisms, such as a reef. In some implementations, calcifying organisms 902 can be a gathering of calcifying organisms such as a shellfish farm or a nursery.

Material dispensing system 904 includes one or more independently controlled material dispensing modules. In example configuration 900, material dispensing system 904 includes material dispensing modules 906a, 906b, 906c, and 906d (collectively referred to as material dispensing modules 906). Each of material dispensing modules 906 can be controlled independently and simultaneously. In some implementations, two or more material dispensing modules 906 can be controlled as a unit. For example, two or more material dispensing modules 906 can be provided with the same control signals.

In example configuration 900, material dispensing modules of material dispensing system 904 are shown to include material dispensing buoys 906a, 906b, and 906c, and material dispensing drone 906d. The material dispensing modules can be implemented as mobile, self-propelled buoys, ships, submarine devices, aircraft, and land-based pipelines among other forms.

Material dispensing modules 906 can be anchored or moored in place. In some implementations, material dispensing modules 906 can be mobile and can be positioned to optimize dispersion patterns of material from each module.

Each of material dispensing modules 906 can include a supply of materials to be dispersed into the ocean. For example, the material dispensing modules 906 can house a supply of alkali compounds such as calcium-containing materials or magnesium-containing materials that can be released into seawater to decrease ocean acidity. The calcium-containing material can include, for example, $CaO_2$ or calcium oxide and the magnesium-containing materials include $MgO_2$ or magnesium oxide. In some implementations, the materials can be any suitable alkali material that can mitigate ocean acidification within a geographical area. The amount of material stored within material dispensing modules 906 can be varied based on parameters such as the needs of calcifying organisms 902 and the water and weather conditions of the seawater surrounding and near calcifying organisms 902.

Material dispensing modules 906 include power systems. Each power system can be an onboard power system that provides power to the particular material dispensing module 906. In some implementations, the power system can provide power to each material dispensing module 906 of the material dispensing modules 906. In some implementations, the power system also provides power to control system 920 and the mixing system, among other systems. In some implementations, the power system can be integrated with, or can act as the main power system for, marine vessels that are part of material dispensing system 904 to provide power for navigation and propulsion systems.

The power system can include generators. For example, the power system can use a heat sink engine, using cold ocean water driven to deeper depths for driving its heat exchange; ocean thermal energy conversion (OTEC); solar power; or other renewable energy systems, such as wind, nuclear, etc. In some implementations, the power system can use, among other types of fuel, the calcium-containing material to generate electric power for the entire system or for individual subsystems such as material dispensing system 904.

In order to achieve a particular concentration of chemical mixture to be released into the ocean, material dispensing system 904 can mix the calcium-containing materials into the surrounding seawater. Details of material dispensing system 904's mixing and dispensing mechanisms are provided below.

In some implementations, material dispensing system 904 dilutes materials before they are released into seawater to achieve a particular concentration. Material dispensing system 904 can control the mixing of the alkali materials with water. For example, material dispensing modules 906 can interface with a mixing system that draws in seawater from the ocean surrounding the modules. Each of the material dispensing modules 906 can, for example, pump seawater into a mixing chamber within the module itself. By sourcing one of the reactants of the propulsion system from its current location, material dispensing modules 906 increase their capacity for materials to be released into seawater. In some implementations, water can be obtained from the ocean through a high pressure outlet. In some implementations, water can be pumped into each of the material dispensing modules 906. In some implementations, water can be stored in a tank or other storage container within or accessible to each material dispensing module 906.

Sensing system 908 is configured to monitor water, weather, and material dispensing parameters, among other measurable parameters. Sensing system 908 includes sensors 910a, 910b, 910c, 910d, 910e, 910f, 910g, 910h, and 910i (collectively referred to as sensors 910). Each of sensors 910 can be a single sensor of a particular type or an array of sensors. Sensors 910 can be placed in various positions on and around material dispensing system 904 or calcifying organisms 902. For example, sensor 910a can be an array of water quality parameter sensors placed on material dispensing buoy 906b. Sensors 910 can be placed along the path of expected flow between material dispensing system 904 and calcifying organisms 902 and on or near the independently controlled modules of material dispensing system 904 or calcifying organisms 902, among other locations. Sensors 910 can be stationary or mobile. For example, sensors 910 can be placed on drones, on boats, or set adrift in seawater.

Sensors 910 detect, for example, water parameters, weather parameters, and material dispensing parameters. Water parameters include current data, water temperatures, pH levels, saturation levels of various chemicals, and $O_2$ levels, levels of dissolved gases and/or compounds, levels of particular matter, among other parameters associated with the local, geographical region in which calcifying organisms 902 are located and other geographical regions. Weather parameters include wind speed and direction, wave data, tide data, solar radiation data, circulation patterns, cloud cover, solar radiation levels, and the weather forecast, among other parameters associated with the weather and environmental conditions. Material dispensing parameters include absolute velocity and water velocity of modules of material dispensing system 904, direction of travel, propulsion mechanism speed, and rate of expulsion of material, among other parameters associated with material dispensing system 904.

Sensors 910 can also detect environmental factors such as seafloor topography and perform remote sensing of target areas. For example, sensors 910 can monitor the pH levels of the area surrounding calcifying organisms 902, for example, a reef, to protect the particular chemical concentration levels required in that area. Data from sensing system 908 can be analyzed to generate data such as mass spectrometry of various materials.

Detection can be done using electrical, optical, and/or magnetic techniques by sensors such as accelerometers, gyroscopes, magnetometers, inertial measurement units (IMUs), GPS, visual sensors, depth sensors, chemical sensors, turbidity sensors, and/or encoders, among other types of detection techniques. Sensors 910 can include velocity sensors, temperature sensors, infrared sensors, sonar sensors, pH sensors, salinity sensors, and biological parameter sensors, among other types of sensors. For example, sensors 910 can include wind sensors, current sensors, anemometers, acoustic doppler current profilers (ADCPs), alkaline pH sensors, bicarbonate level sensors, dissolved $CO_2$ sensors, total $CO_2$ sensors, and partial pressure sensors, among other types of sensors. Sensors 910 can include biometric sensors, chlorophyll sensors, fluorescence sensors, acoustic sensors, visual sensors, and other sensors adapted to detect organisms. For example, sensors 910 can include hydrophones and stereo cameras that detect and track marine life over time.

In one example, sensor 910d is an array of sensors in the flow path of material dispensing system 904 that measures the ocean chemistry of the water within the plume of material being expelled from material dispensing system 904. This water chemistry data can be used, for example, as feedback to the system to adjust the control instructions provided to material dispensing system 904.

In some implementations, sensors 910 can include sensors that monitor environmental parameters such as approaching macrofauna such as whales, dolphins, and fish, among other forms of aquatic life. For example, sensors 910 can include a sonar array that provides data to the system, where the system implements an immediate response to detection of an approaching whale. This response can include control instructions to alter the operation of material dispensing system 904, such as controlling the material dispensing modules 906 to move out of the path of the approaching whale or stopping expulsion of materials temporarily, among other response actions.

Control system 920 includes one or more computer processors that control the operation of various components of the system depicted in example configuration 900, including sensing system 908 and material dispensing system 904, and components external to the system, including systems that are integrated with or communicably connected to the system, such as satellites, remote computing devices, and marine vessels, among other systems. In example configuration 900 of the system, control system 920 is implemented as a single module. Control system 920 can be implemented as a distributed computing system over a network connection such as the Internet.

In example configuration 900 of the system, control system 920 is depicted as being contained within one of the material dispensing modules 906. In some implementations, a particular material dispensing module 906 contains control system 920 and is communicably connected with the other material dispensing modules 906 and other components of material dispensing system 904. The particular material dispensing module 906 can then communicate control signals to other components of material dispensing system 904. In some implementations, control system 920 can communicate control signals directly to other components of material dispensing system 904.

In other configurations, control system 920 can be separate from the material dispensing modules 906 and can be communicably connected to each component of the material dispensing system 904.

In some implementations, each material dispensing module 906 includes its own control system 920 that can operate independently and/or receive control signals from another control system 920, adding a layer of redundancy in case of failure at any one point in the system. For example, each material dispensing module 906 can have its own control system 920 that can also receive control signals from a site control system 920 that is local to the target region surrounding or near calcifying organisms 902.

In some implementations, control system 920 generates control signals for the system locally. The one or more computer processors of control system 920 continually and automatically determine control signals for the system without communicating with a remote processing system. For example, control system 920 can receive ocean chemistry feedback data from sensors 910 in response to actions taken by material dispensing system 904 and process the data to determine and generate control signals for material dispensing system 904 to alter or maintain a target level of ocean chemistry or an area into which material is dispensed. Control system 920 generates control signals that control the movement of material dispensing modules 906, the mixing of materials to be released by material dispensing system 904, and the expulsion of materials by material dispensing system 904. Control system 920 can control each component of material dispensing system 904 independently. In some implementations, control system 920 can coordinate control signals to multiple components of control system 920.

In some implementations, control system 920 generates control signals for material dispensing systems remotely. For example, the one or more computer processors of control system 920 can be implemented as a distributed computing system across a network and can continually and automatically determine control signals for the system by communicating with and/or through a remote processing system. In some implementations, control system 920 can control more than one material dispensing system 904. For example, control system 920 can be located locally to one material dispensing system 904 and remotely from another material dispensing system 904 and control system can generate control signals for each of the material dispensing systems 904. In some implementations, control system 920 can be located remotely from each material dispensing system 904.

Control system 920 generates control signals for material dispensing system 904. Control system 920 uses models including machine learning models and/or finite element models to predict ocean flow, mixing, chemical dispersion, and plume patterns, among other processes. Control system 920 is configured to determine mixing and output instructions for material dispersion system 904 according to target parameters such as ocean chemistry levels and the modelled processes. For example, control system 920 can determine when to release materials, what concentration of seawater to chemicals is needed to produce a desired ocean chemistry concentration within a specific region surrounding or near calcifying organisms 902 or another defined region, and how to achieve that concentration.

Control system 920 controls sensors 910 to collect and/or record data associated with actions of the material dispensing system 904, ocean chemistry, weather, and water conditions surrounding material dispensing modules 906, among other measurable parameters. For example, sensors 910 can collect and/or record data associated with upwelling in a particular geographic area. Sensors 910 can also measure movement and activity through optical, electrical, and magnetic techniques, among other detection techniques.

Control system 920 is communicatively connected to sensing system 908 and material dispensing system 904. In some implementations, control system 920 is connected to sensing system 908 and material dispensing system 904 through communications buses with sealed conduits that protect against solid particles and liquid ingress. In some implementations, control system 920 transmits control signals to components of the system wirelessly through various wireless communications methods, such as RF, sonic transmission, electromagnetic induction, etc.

Control system 920 can receive feedback from sensing system 908. Control system 920 can use the feedback from sensing system 908 to adjust subsequent control signals to the components of the system.

Control system 920 can be communicatively connected to sensors other than sensors 910, such as sensors external to the system, and can use the data collected by sensors external to the system in addition to the data collected by sensors 910 to generate control signals for the system. For example, control system 920 can be communicatively connected to external weather monitoring systems, observation satellites, or GPS satellites that are external to the system. Control system 920 can also receive sets of data such as surveys of migration patterns of aquatic life and real-time data such as data collected by networks of buoys.

Control system 920 uses the sensor data to generate control signals for material dispensing system 904. For example, control system 920 can determine that a particular area, such as an area surrounding calcifying organisms 902, is protected and use GPS to enforce geofencing technology, preventing the release and/or propagation of materials into the particular area. Control system 920 can, for example, receive a predetermined set of protected areas. Control system 920 can detect that a particular area should be protected or restricted. For example, if control system 920 determines, based on data from sensing system 908, that there is a gathering of calcifying organisms, control system 920 can automatically designate an area as protected or restricted.

Control system 920 generates control signals for navigation systems for the material dispensing modules 906 that are mobile and can be independently controlled. For example, control system 920 can control the navigation system of a material dispensing module 906 to control propellers or other forms of propulsion for steering the module. In example configuration 900, material dispensing modules 906 are propelled and steered by propellers. In other implementations, material dispensing modules 906 can be propelled and steered using other systems. The navigation system can be communicatively coupled to the propellers. In some implementations, the navigation system is coupled to the propellers through communication buses within environmentally sealed conduits. In some implementations, the navigation system transmits control signals to the propellers wirelessly through various wireless communications methods, such as RF, sonic transmission, electromagnetic induction, etc.

In some implementations, the navigation system can receive feedback from the propellers. For example, the navigation system can receive the actual rotational velocity of a propeller. The navigation system can use the feedback from the propellers to adjust subsequent control signals to the propellers.

The navigation system can determine a path through the ocean for the material dispensing module 906 and corresponding control signals for the propellers locally. In some implementations, the navigation system is communicatively coupled to sensing system 908, and uses data collected by sensing system 908 to navigate. In some implementations, the navigation system is coupled to sensing system 908 through communication buses within environmentally sealed conduits. In some implementations, the navigation system receives sensor data from sensing system 908 wirelessly through various wireless communications methods, such as RF, sonic transmission, electromagnetic induction, etc.

In some implementations, the navigation system communicates with control system 920 to receive new bearings. For example, sensing system 908 can transmit position data of a material dispensing module 906 to control system 920, which processes the data and transmits a new bearing to the navigation system. The navigation system can receive the new bearing, process the data, and generate updated control signals for the propellers. In some implementations, the navigation system communicates with control system 920 to receive new control signals for the propellers.

In some implementations, the navigation system can generate updated control signals for the propellers locally, without communicating with a remote server. For example, the navigation system can receive data from sensing system 908, process the data to determine a new bearing, and generate updated control signals for the propellers. In some implementations, the navigation system can navigate material dispensing modules 906 without the use of GPS. For example, the navigation system can navigate material dispensing modules 906 using ocean positioning data collected by sensing system 908.

Sensing system 908 can transmit the data it collects to the navigation system. For example, sensing system 908 can include a temperature sensor that detects and records the temperature of the water. Sensing system 908 can include sensor arrays and transducers for receiving and transmitting underwater signals for positioning in the ocean and/or communicating between material dispensing modules 906 and/or with a separate sea vessel, such as a maintenance boat. For example, sensing system 908 can include sonar sensor arrays that detect the position of a particular material dispensing module 906 in the ocean.

Sensing system 908 can include vision sensors, such as sonar, cameras, etc. that detect objects or acquire images for image analysis by sensing system 908 or control system 920.

In some implementations, sensing system 908 can detect objects near a material dispensing module 906. For example, sensing system 908 can use a sonar sensor array to detect objects on the ocean floor. In some implementations, sensing system 908 can detect currents near a material dispensing module 906. For example, sensing system 908 can use water temperature and pressure data to determine the boundaries of a current.

The navigation system can use the data collected by sensing system 908 to maintain optimal placement of material dispensing modules 906 relative to calcifying organisms 902. The navigation system can detect and predict conditions such as tidal, wind, or ocean currents. For example, the navigation system can receive data from sensing system 908 indicating that the material dispensing module 906 is currently caught in a fast-moving current and the material being released is dispersing in an unexpected pattern, but that the boundary between the current and calm water is 5 m below the center of the material dispensing module 906's current position. In this example, the navigation system can generate control signals for the propellers 906 to sink the structure 900 below the boundary of the fast-moving current. The navigation system can steer material dispensing modules 906 into or out of currents, based on a desired chemical concentration level and/or a desired geographical region, among other factors.

The navigation system can control the propellers to keep material dispensing modules 906 geostationary. For example, in a storm, or other situations in which navigating conditions are suboptimal, the navigation system can receive feedback form the propellers and sensing system 908 to maintain a position in which a module is to remain.

The navigation system can control the propellers to change a course of a material dispensing module 906. For example, if the material dispensing module 906 is called into a docking station for maintenance, the navigation system can receive the coordinates of the docking station and can generate control signals for the propellers to steer the module to the docking station.

The navigation system controls the propellers to steer a material dispensing module 906 based on chemical concentrations of a region of seawater surrounding or near calcifying organisms 902, current and other water conditions, the dispersion pattern of the material released from the material dispensing module 906, and/or the condition of the calcifying organisms 902, among other factors. The navigation system can steer the material dispensing module 906 based on sensor data received from sensing system 908 to maintain optimal water conditions and control the dispersion of the material into the desired region.

The above description of the navigation system of material dispensing system 904 focuses on the navigation and control of marine material dispensing modules 906. The navigation system or systems of material dispensing system 904 can control material dispensing modules 906 on land and in the air using similar techniques as described with respect to modules located in the ocean.

Material dispensing system 904 is configured to dispense alkali materials into the surrounding water. Material dispensing system 904 can include various subsystems configured for the mixing and expelling of materials from, for example, each of the material dispensing modules 906. Subsystems of material dispensing system 904 can be housed within the material dispensing modules 906, placed in various positions along the area surrounding calcifying organisms 902, and other regions. In some implementations, subsystems, such as a mixing subsystem, of material dispensing system 904 can be housed separately from the material dispensing modules 906. These subsystems can be communicably connected and accessible to the material dispensing modules 906 and other components of the material dispensing system 904 and control system 920.

Material dispensing system 904 can include a mixing subsystem that can mix precise proportions of water and alkali material onboard a material dispensing module 906. For example, material dispensing module 906d can include a mixing subsystem that mixes water with calcium oxide to produce a particular concentration for dispensing into seawater proximate to calcifying organisms 902. The mixing subsystem can mix substances from different sources. For example, material dispensing system 904's mixing subsystem can mix seawater drawn into a material dispensing module 906 through ports with, for example, calcium oxide stored onboard the material dispensing module 906. The mixing subsystem includes components configured to perform mixing and pumping, among other actions. Material dispensing system 904's mixing subsystem can dispense a calculated portion of substances directly into seawater. For example, control system 920 can generate control signals for material dispensing system 904 to dispense an amount of calcium oxide into the seawater surrounding calcifying organisms 902 to be mixed with the turbulence and upwelling in the water according to a target chemical concentration level.

Material dispensing system 904 can include, for example, a dispensing subsystem that can expel substances from material dispensing modules 906. The dispensing subsystem can expel substances from material dispensing modules 906 through various openings in the modules such as ports placed in various positions along the modules. For example, each module can independently dispense substances through each port. Material dispensing modules 906 can each dispense substances through multiple ports 906 at the same time. The dispensing subsystem includes components configured to perform expulsion of particular amounts of substances with particular force at a particular rate. These substances can be mixed onboard material dispensing modules 906 or can be expelled to be mixed with seawater. For example, the dispensing subsystem can expel a calculated amount of calcium oxide at a particular rate over a particular period of time with a calculated amount of force from a material dispensing module 906 to be mixed with the tidal current surrounding calcifying organisms 902.

In one example, the dispensing subsystem can include a jet that can spray a diluted mixture of alkali compounds in the air to increase dissolved $CO_2$ and balance ocean acidity more quickly than releasing calcium oxide directly into the seawater. In another example, material dispensing system 904 can eject calcium oxide into seawater surrounding calcifying organisms 902 in a particular direction, with a calculated force.

Material dispensing system 904 can include mixing and dispensing systems that coordinate within a material dispensing module 906. For example, a material dispensing module 906 can include a pump and an impeller combination that draws water into the module through a pipe and injects a material compound stored in the material dispensing module 906 into the water in the pipe. The turbulence generated by injecting the compound into the water mixes the material with the water to dilute the compound, and the material dispensing module 906 can eject the resulting solution. Material dispensing modules 906 can include, for example, a grate stirrer that generates turbulence to release solutions to further disperse into the local ocean region.

FIGS. 10A and 10B are different views of a standards-compliant shipping container outfitted with a protective bladder.

FIG. 10A is a view 1000 of a standards-compliant shipping cargo container outfitted with a protective bladder. Cargo container 604 is a cargo container as described above with respect to FIGS. 6A and 6B. Cargo container 604 can be a standards-compliant container used for shipping cargo internationally. For example, cargo container 604 can be ISO compliant.

Cargo container 604 contains a protective bladder 1002. In view 1000, protective bladder 1002 is in an empty state.

Protective bladder is a flexible bladder that fits within cargo containers 604. Protective bladder 1002 includes a protective material that resists the corrosive effects of calcium-containing material. The protective material selected for use in manufacturing protective bladder can depend on the particular substance to be stored in protective bladder 1002. In some implementations, protective bladder 1002 includes a layer of material that is protective over a flexible, water-tight material. In some implementations, protective bladder 1002 is manufactured entirely out of a protective material.

Protective bladder 1002 can be loaded onto the floor of cargo container 604 prior to cargo container 604 being loaded with cargo. For example, protective bladder 1002 can collapse such that cargo container 604 can be fully loaded with cargo.

Port 1004 is configured to allow the flow of material between the inside of cargo container 604 and the outside of cargo container 604. For example, port 1004 can be connected to the mixing system 630 through a network of piping 644 and the container control components 646 and 648. In some implementations, piping connections to cargo container 604 can be installed once and used throughout marine vessel 602's journey. In some implementations, the piping connections to cargo container 604 can be moved throughout marine vessel 602's journey.

Port 1004 is a connection that connects to the inside of protective bladder 1002 that allows substances to be pumped into and out of protective bladder 1002. Port 1004 provides a sealed connection point such that the substances contained within protective bladder 1002 do not leak out of protective bladder 1002 into cargo container 604 or into the hold of marine vessel 602 where cargo container 604 is located.

In one example, port 1004 can be mounted to a plate that replaces one door of cargo container 604. The standard door can be stowed onboard marine vessel 602 for the remainder of the journey. For example, the standard door can be stored inside of cargo container 604 along with protective bladder 1002.

In some implementations, cargo container 604 can include multiple ports 1004. For example, cargo container 604 can include a seawater inlet and a mixture outlet.

In some implementations, protective bladders 1002 are interconnected, eliminating or reducing the need for valves in the container-container connections 648.

As described above with respect to FIGS. 6A and 6B, sensor 110g is a sensor located within protective bladder

1002. Sensor 610g can be a sensor for measuring chemical concentrations, mixing, and other parameters within cargo container 604 as described above with respect to FIG. 6B. In some implementations, sensor 610g can be placed at the outlet of protective bladder 1002.

FIG. 10B is another view 1050 of standards-compliant shipping container 604 outfitted with a protective bladder 1002. In view 1050, protective bladder 1002 is at least partially full of calcium-containing material and/or seawater.

Protective bladder 1002 is manufactured to fit within cargo container even when full of calcium-containing material and/or seawater.

In some implementations, cargo containers 604 can be half-height containers that allow full-volume loading within the mass limit.

FIG. 11 is a flow chart of an example process 1100 of ocean chemistry modification. Process 1100 can be implemented by control systems for ocean chemistry modification such as systems 600, 650, and 900 as described above with respect to FIGS. 1-10. In this particular example, process 1100 is described with respect to systems 600, 650, and 900. Briefly, according to an example, the process 1100 begins with step 1102 by modelling, based on one or more parameters selected from the group consisting of a geographical parameter defining an area in ocean water, an ocean chemistry parameter, and a material parameter, a particular aspect of ocean chemistry. For example, control system 620 can use the physical properties of calcium powder to model the pH level and dispersion of calcium in the seawater surrounding marine vessel 602 or calcifying organisms 902.

Process 1100 continues with step 1104 by determining, based on the one or more parameters, the modelled particular aspect of ocean chemistry, and a target chemical concentration, a first amount of material and a first rate at which the material is to be released from a ship into ocean water. For example, control system 620 can determine, based on the physical properties of calcium powder, the pH level, and dispersion of the amount of calcium, and a target concentration level of calcium, an amount of calcium and the rate at which the calcium should be released from marine vessel 602 into the seawater surrounding marine vessel 602. In some implementations, step 1104 includes determining, based on the one or more parameters, the modelled material dispersion on the particular time scale, and a target chemical parameter, a first amount of material, a release time, and a first rate at which the material is to be released into ocean water. For example, control system 920 can determine, based on the physical properties of calcium oxide, the pH level, dispersion of the amount of calcium oxide, and a target pH level of the particular region of water surrounding calcifying organisms, an amount of calcium oxide and the rate at which the calcium oxide should be released from a material dispensing module 906 into the seawater surrounding calcifying organisms 902. Control system 920 also determines a release time at which the calcium oxide should be released at the determined rate.

Process 1100 continues with step 1106 by generating a control instruction for a material dispensing system to release the first amount of the material at the first rate into ocean water. For example, control system 620 can generate a control instruction for material dispensing system 630 to release the determined amount of calcium at the determined rate into the seawater surrounding marine vessel 602 or calcifying organisms 902.

Figure 12:
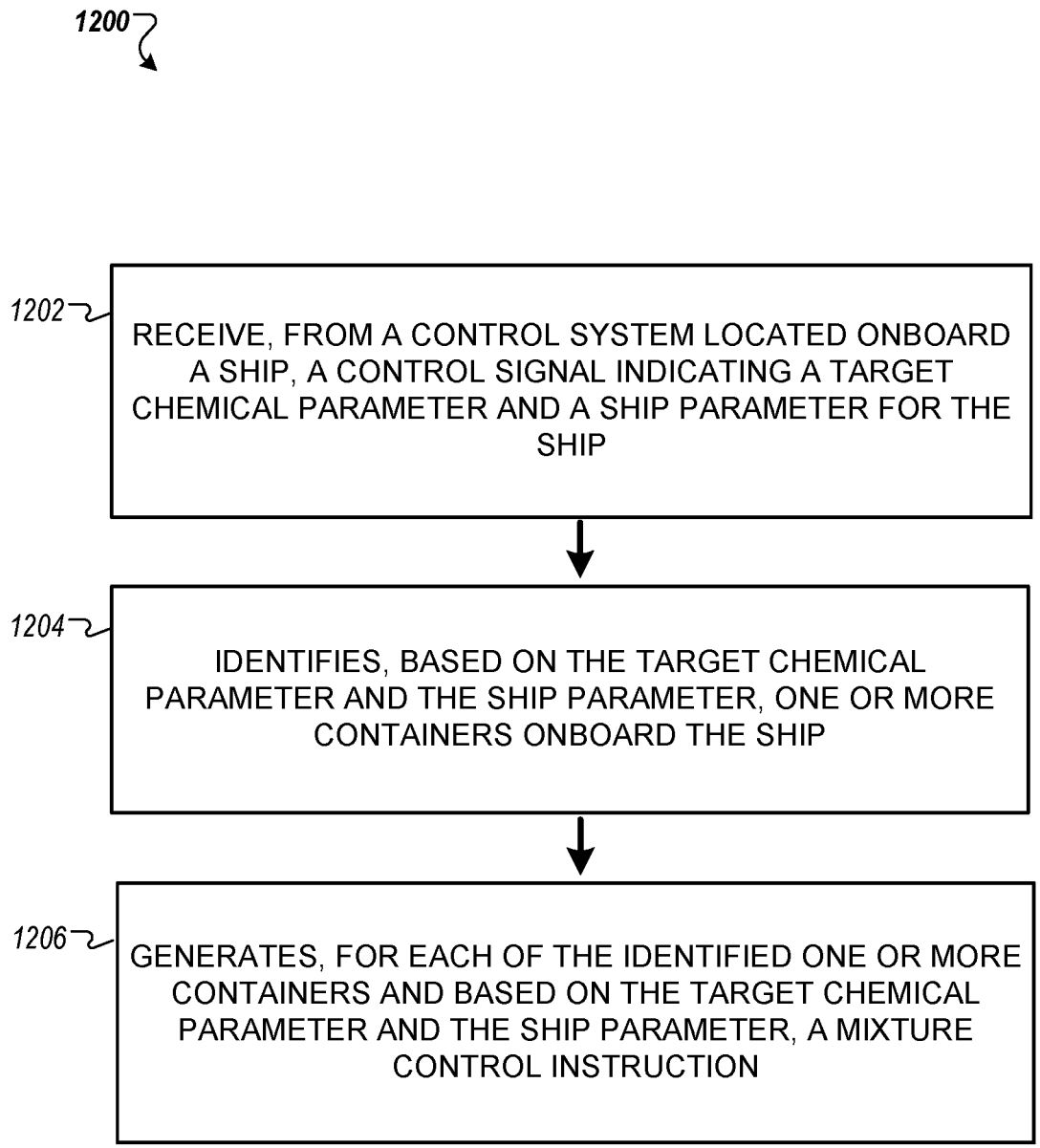
FIG. 12 is a flow chart of an example process for controlling the mixing and dispensing of calcium-containing material from a ship.

FIG. 12 is a flow chart of an example process 1200 for controlling the mixing and dispensing of calcium-containing material from a ship. Process 1200 can be implemented by 100, 600, 650, and 900 as described above with respect to FIGS. 1-9. In this particular example, process 1200 is described with respect to system 650.

In one example, during marine vessel 602's voyage, control system 620 can provide control signals to material dispensing system 630 and container controller 640 to pump seawater into one or more of cargo containers 604 fitted with protective bladders 1002. Cargo containers 604 can contain calcium-containing material. Container controller 640 can provide control signals to pump 642 to pump seawater into marine vessel 602 through a port 606. In some implementations, protective bladders 1002 can be initially filled with a concentrated slurry of seawater and calcium-containing material and the slurry can be released along the journey instead of, or in addition to, mixing seawater into calcium-containing material to create a diluted slurry.

Control system 620 can determine a target chemical concentration to be achieved and provide control signals to container controller 630 to mix the seawater into the calcium-containing material for eventual discharge into the ocean. The mixing dilutes the calcium-containing material, which can be basic, to prevent the discharge of highly alkali material. In some implementations, the seawater is directly mixed into a particular cargo container 604 storing calcium-containing material. In some implementations, the seawater is drawn into an intermediary cargo container 604 solely for storing seawater and mixed with the calcium-containing material in a designated mixing container. In one example, the intermediary cargo container 604 can be an existing ballast tank onboard marine vessel 602. In some implementations, the seawater is drawn directly into a mixing cargo container 604 and the calcium-containing material is pumped into the mixing cargo container 604.

In some implementations, drawing the seawater onboard marine vessel 602 can affect the ballast of marine vessel 602. Container controller 640 can determine an appropriate amount of seawater to be drawn into marine vessel's 602 ballast to maintain required ballast mass and avoid listing.

Once container controller 640 determines that the mixing is completed according to a target chemical concentration, the mixture can be pumped out of cargo container 604 and ejected into the seawater surrounding marine vessel 602 by material dispensing system 630. In some implementations, the mixture can be dispensed directly out of cargo container 604 without flowing through piping 644. For example, cargo container 604 may have a port that allows the flow of substances directly to the outside of marine vessel 602.

In some implementations, container controller 640 can perform the mixing and dispensation sequentially. For example, one cargo container 604 storing the calcium-containing material can be filled with a measured amount of seawater and dispensed and then the next container can be filled and mixed with seawater and released, until the contents of each of cargo containers 604 storing the calcium-containing material are dispersed into the ocean.

Once marine vessel 602 reaches its destination port, protective bladders 1002 can be removed from cargo containers 604. For example, protective bladders 1002 can be removed from cargo containers 604 and then the bladders can be loaded into a single container for shipping back to the origin. In some implementations, cargo containers 604 having protective bladders 1002 are removed from the ship and then the protective bladders are removed and stored for shipment back to the origin.

Briefly, according to an example, the container control process 1200 begins with step 1202 in which a container controller receives, from a control system located onboard a ship, a control signal indicating a target chemical parameter and a ship parameter for the ship. For example, container controller 640 can receive a control instruction from control system 620 onboard marine vessel 602 indicating a target chemical concentration and a required ballast mass for marine vessel 602.

Process 1200 continues with step 1204 in which the container controller identifies, based on the target chemical parameter and the ship parameter, one or more containers onboard the ship. For example, container controller 640 can identify, based on the control signal from control system 620, one or more particular cargo containers 604 onboard marine vessel 602. Container controller 640 can identify the particular cargo container 604 based on information regarding the amount of calcium-containing material stored in each cargo container 604 and information regarding the ship stability requirements of marine vessel 602.

Process 1200 continues with step 1206 in which the container controller generates, for each of the identified one or more containers and based on the target chemical parameter and the ship parameter, a mixture control instruction. For example, container controller 640 can generate, for each of the one or more cargo containers 604, a control instruction for the container control components 646, 648 to perform mixing of seawater and according to the target chemical concentration and required ballast mass. Container controller 640 can, for example, monitor the mixing process through sensing system 608. Sensing system 608 can provide feedback to container controller 640 to adjust the mixing process and control signals to its mixing subsystem.

A number of implementations have been described. Nevertheless, it will be understood that various modifications may be made without departing from the spirit and scope of the disclosure. For example, various forms of the flows shown above may be used, with steps re-ordered, added, or removed.

All of the functional operations described in this specification may be implemented in digital electronic circuitry, or in computer software, firmware, or hardware, including the structures disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, the techniques disclosed may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may include a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A method, comprising:
   receiving, at a carbon negative energy storage system, input comprising calcium oxide and water;
   reacting, within a reaction chamber of the carbon negative energy storage system, the calcium oxide and water to release energy and generate calcium hydroxide;
   directing, by the carbon negative energy storage system, the released energy to a requesting end user;
   providing, by the carbon negative energy storage system, the calcium hydroxide to a marine vessel ballasting system; and
   releasing a mixture of the calcium hydroxide and ballast water from the marine vessel ballasting system into the ocean to sequester atmospheric $CO_2$.

2. The method of claim 1, wherein the input further comprises at least one of: calcium metal, magnesium oxide, and magnesium metal.

3. The method of claim 1, wherein reacting the calcium oxide and water is performed on-shore.

4. The method of claim 1, wherein reacting the calcium oxide and water is performed aboard a marine vessel.

5. The method of claim 1, wherein the released energy directly provides power to the requesting end user through an electrochemical mechanism in the form of electric energy.

6. The method of claim 1, wherein the released energy is thermal energy.

7. The method of claim 1, wherein directing the released energy to the requesting end user comprises:
   directing the released energy to a heat engine; and
   directing the output of the heat engine to an electrical generator to facilitate propulsion or onboard electricity generation,
   wherein the released energy is thermal energy.

8. The method of claim 1, wherein releasing a mixture of the calcium hydroxide and ballast water from the marine vessel ballasting system into the ocean to sequester atmospheric $CO_2$ comprises:
   controlling, by the carbon negative energy storage system and according to at least one of a target rate of release, a target volume of release, and a geographic location, the release of the calcium hydroxide.

9. A carbon negative ship ballasting system, comprising:
   an energy recovery system configured to react input comprising calcium oxide and water to release energy and generate calcium hydroxide and direct the released energy to a requesting end user; and
   a marine vessel, comprising:
      one or more ballast tanks configured to receive the calcium hydroxide from the energy recovery system; and
      a pumping system configured to pump ballast fluid containing the calcium hydroxide into and out of the one or more ballast tanks, wherein pumping ballast fluid containing the calcium hydroxide out of the ballast tank sequesters atmospheric $CO_2$.

10. The system of claim 9, wherein the pumping system further comprises a material dispensing system comprising one or more independently controlled modules that each release material into ocean water.

11. The system of claim 9, the marine vessel further comprising:
    a sensing system that detects one or more parameters selected from the group consisting of: a geographical parameter defining an area in ocean water, an ocean chemistry parameter, and a material parameter; and
    a controller that controls the pumping system according to a target chemical concentration by:
       modelling, based on the one or more parameters, a particular aspect of ocean chemistry;
       determining, based on the one or more parameters, the modelled particular aspect of ocean chemistry, and the target chemical concentration, a first amount of material and a first rate at which the material is to be released from the ship into ocean water; and
       generating a control instruction for the pumping system to release the first amount of the material at the first rate into ocean water.

12. The system of claim 9, wherein the released energy directly provides power through an electrochemical mechanism in the form of electric energy.

13. The system of claim 9, wherein the released energy is thermal energy.

14. The system of claim 9, wherein directing the released energy to the requesting end user comprises:
    directing the released energy to a heat engine; and directing the output of the heat engine to an electrical generator to facilitate propulsion or onboard electricity generation, wherein the released energy is thermal energy.

15. The system of claim 9, wherein directing the released energy to facilitate propulsion or onboard electricity generation comprises directing the released energy to a turbine, and wherein the released energy is thermal energy.

16. The system of claim 9, wherein dispensing the calcium hydroxide into the ocean to sequester atmospheric $CO_2$ comprises:

controlling, by the carbon negative energy generation system and according to at least one of a target rate of release, a target volume of release, and a geographic location, the release of the calcium hydroxide.

17. The system of claim 9, further comprising:

two or more shipping standard compliant containers connected by piping, wherein a first container of the two or more containers contains seawater and a second container of the two or more containers contains calcium oxide, each of the two or more containers having a protective bladder lining manufactured according to a target protection parameter based on the calcium oxide; and a mixing system that is connected to each of the two or more containers by piping; and a controller that controls the mixing system by providing control signals to the mixing system to control the mixing of calcium oxide and ocean water by controlling the connection between the second container and the first container.

18. A computer-readable storage device storing instructions that when executed by one or more processors cause the one or more processors to perform operations comprising:

receiving, at a carbon negative energy storage system, input comprising calcium oxide and water;

reacting, within a reaction chamber of the carbon negative energy storage system, the calcium oxide and water to release energy and generate calcium hydroxide;

directing, by the carbon negative energy storage system, the released energy to a requesting end user;

providing, by the carbon negative energy storage system, the calcium hydroxide to a marine vessel ballasting system; and releasing a mixture of the calcium hydroxide and ballast water from the marine vessel ballasting system into the ocean to sequester atmospheric $CO_2$.

19. The computer-readable storage device of claim 18, wherein releasing a mixture of the calcium hydroxide and ballast water from the marine vessel ballasting system into the ocean to sequester atmospheric $CO_2$ comprises:

controlling, by the carbon negative energy storage system and according to at least one of a target rate of release, a target volume of release, and a geographic location, the release of the calcium hydroxide.

20. The computer-readable storage device of claim 18, wherein reacting the calcium oxide and water is performed on-shore.

* * * * *